(12) United States Patent
Zhang et al.

(10) Patent No.: US 11,800,265 B2
(45) Date of Patent: Oct. 24, 2023

(54) BANDWIDTH ALLOCATION METHOD AND RELATED DEVICE

(71) Applicant: HUAWEI TECHNOLOGIES CO., LTD., Guangdong (CN)

(72) Inventors: Lun Zhang, Dongguan (CN); Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 17/535,073

(22) Filed: Nov. 24, 2021

(65) Prior Publication Data

US 2022/0086544 A1 Mar. 17, 2022

Related U.S. Application Data

(63) Continuation of application No. PCT/CN2020/071430, filed on Jan. 10, 2020.

(30) Foreign Application Priority Data

May 24, 2019 (CN) .......................... 201910440445.4

(51) Int. Cl.
*H04Q 11/00* (2006.01)

(52) U.S. Cl.
CPC . *H04Q 11/0067* (2013.01); *H04Q 2011/0086* (2013.01)

(58) Field of Classification Search
CPC ................................................ H04Q 11/0067
See application file for complete search history.

(56) References Cited

U.S. PATENT DOCUMENTS 7,362,975 B2 * 4/2008 Choi .................. H04Q 11/0067
398/58
9,178,713 B1 * 11/2015 Johnston ............... H04L 7/0075
(Continued)

FOREIGN PATENT DOCUMENTS

CN 1983877 A 6/2007
CN 101141410 A 3/2008
(Continued)

OTHER PUBLICATIONS

ITU-T, G.984.1, Telecommunication Standardization Sector of ITU, Series G: Transmission Systems and Media, Digital Systems and Networks, Digital sections and digital line system—Optical line systems for local and access networks, Gigabit-capable passive optical networks(GPON): General characteristics , (Mar. 2008), 43 pages.

(Continued)

*Primary Examiner* — Shi K Li

(57) ABSTRACT

A bandwidth allocation method and a related device are disclosed. An exemplary method includes: when a total sum of a cumulative sum of fixed bandwidth configuration upper limits of traffic bearing entities and a cumulative sum of assured bandwidth configuration upper limits of the traffic bearing entities is greater than a maximum bandwidth value of a passive optical network (PON) port of a piece of central office equipment, determining, by the central office equipment based on a bandwidth configuration upper limit of each traffic bearing entity and a required bandwidth value of the traffic bearing entity, a bandwidth value actually allocated to the traffic bearing entity. In this way, a part of bandwidth is allocated to each traffic bearing entity. This avoids a case in which no bandwidth is allocated to some traffic bearing entities. Therefore, resource allocation is more appropriate.

13 Claims, 9 Drawing Sheets

(56) References Cited

U.S. PATENT DOCUMENTS

2003/0043741 A1    3/2003    Mukai et al.
2006/0153564 A1*  7/2006    Ryu .................. H04Q 11/0067
                                                                     398/69

FOREIGN PATENT DOCUMENTS

| CN | 101771902 A | 7/2010 |
|----|-------------|--------|
| CN | 101815035 A | 8/2010 |
| CN | 107786456 A | 3/2018 |

OTHER PUBLICATIONS

Office Action issued in CN201910440445.4, dated Apr. 19, 2021, 7 pages.

International Search Report and Written Opinion issued in PCT/CN2020/071430, dated Apr. 8, 2020, 8 pages.

Shin-ichi Yoshihara et al, A Dynamic Bandwidth Assignment Algorithm for B-PON, 2002 IEEE, total 5 pages.

Pandelis Kourtessis et al, Efficient T-CONT-Agnostic Bandwidth and Wavelength Allocation for NG-PON2, vol. 11, No. 7/Jul. 2019/J. Opt. Commun. Netw, total 14 pages.

Hun-je Yeon et al., High Utilization and Hybrid Granting algorithm for EPON, 2006 IEEE, total 6 pages.

ITU-T G.989.3 Amendment 2 (Nov. 2018), Series G: Transmission Systems and Media, Digital Systems and Networks, Digital sections and digital line system—Optical line systems for local and access networks, 40-Gigabit-capable passive optical networks (NG-PON2): Transmission convergence layer specification, Amendment 2, total 274 pages.

ITU-T G.983.4(Nov. 2001), Series G: Transmission Systems and Media, Digital Systems and Networks Digital sections and digital line system—Optical line systems for local and access networks, A broadband optical access system with increased service capability using dynamic bandwidth assignment, total 92 pages.

Extended European Search Report issued in EP20814371.9, dated May 10, 2022, 13 pages.

\* cited by examiner

BANDWIDTH ALLOCATION METHOD AND RELATED DEVICE

CROSS-REFERENCE TO RELATED APPLICATIONS

This application is a continuation of International Application No. PCT/CN2020/071430, filed on Jan. 10, 2020, which claims priority to Chinese Patent Application No. 201910440445.4, filed on May 24, 2019. The disclosures of the aforementioned applications are hereby incorporated by reference in their entireties.

TECHNICAL FIELD

Embodiments of this application relate to the field of bandwidth allocation, and in particular, to a bandwidth allocation method and a related device.

BACKGROUND

A passive optical network (PON) is a single-fiber bidirectional optical access network that uses a point-to-multipoint (P2MP) structure. The PON network system includes a piece of central office equipment and one or more pieces of customer premises equipment. In the passive optical network, the central office equipment needs to allocate bandwidth to the one or more pieces of customer premises equipment to manage upstream bandwidth allocation at a transmission convergence layer of the PON system.

In a conventional-technology solution, the central office equipment receives bandwidth allocation requests sent by a plurality of pieces of customer premises equipment, and allocates bandwidth to each traffic bearing entity based on the bandwidth allocation request. However, when a cumulative sum of required bandwidth values that are of the traffic bearing entities and that are indicated by the bandwidth allocation requests sent by the plurality pieces of customer premises equipment is greater than a maximum bandwidth value of a PON port of the central office equipment, the central office equipment allocates bandwidth to each traffic bearing entity based on a preset bandwidth upper limit.

In example embodiments of the present disclosure, because bandwidth is allocated to the traffic bearing entity based on a preset bandwidth upper limit, no bandwidth may be allocated to some traffic bearing entities, and hence resource allocation is not appropriate.

SUMMARY

Embodiments of this application provide a bandwidth allocation method and a related device, to improve appropriateness of resource allocation.

According to a first aspect, an embodiment of this application provides a bandwidth allocation method, including: In a bandwidth allocation period, a piece of central office equipment obtains a required bandwidth value of each of a plurality of traffic bearing entities in each customer premises equipment from one or more pieces of customer premises equipment, where the required bandwidth value may reflect bandwidth required by the traffic bearing entity. Then, the central office equipment may calculate a total sum of a cumulative sum of fixed bandwidth configuration upper limit values of the traffic bearing entities and a cumulative sum of assured bandwidth configuration upper limit values of the traffic bearing entities. In addition, when the total sum of the cumulative sum of the fixed bandwidth configuration upper limit values of the traffic bearing entities and the cumulative sum of the assured bandwidth configuration upper limit values of the traffic bearing entities is greater than a maximum bandwidth value of a passive optical network (PON) port of the central office equipment, the central office equipment determines, based on the fixed bandwidth configuration upper limit value of each traffic bearing entity, the assured bandwidth configuration upper limit value of the traffic bearing entity, and the required bandwidth value of the traffic bearing entity, a bandwidth value actually allocated to the traffic bearing entity. Subsequently, the central office equipment may encapsulate, into an authorization message, the bandwidth value actually allocated to each traffic bearing entity, and send the authorization message to each customer premises equipment, where the authorization message is used to indicate the bandwidth value actually allocated to each traffic bearing entity in the customer premises equipment.

In this embodiment, the central office equipment allows the total sum, of the cumulative sum of the fixed bandwidth configuration upper limit values of the traffic bearing entities and the cumulative sum of the assured bandwidth configuration upper limit values of the traffic bearing entities, to be greater than the maximum bandwidth value of the PON port of the central office equipment. In this case, the central office equipment may determine, based on the fixed bandwidth configuration upper limit value of each traffic bearing entity, the assured bandwidth configuration upper limit value of the traffic bearing entity, and the required bandwidth value of the traffic bearing entity, the bandwidth value actually allocated to the traffic bearing entity. The central office equipment considers more factors during bandwidth allocation, and may allocate a part of bandwidth to each traffic bearing entity. This avoids a case in which no bandwidth is allocated to some traffic bearing entities. Therefore, resource allocation is more appropriate.

With reference to the first aspect, in a first implementation of the first aspect of the embodiments of this application, when the bandwidth value actually allocated to the traffic bearing entity includes a fixed bandwidth value of the traffic bearing entity and an assured bandwidth value of the traffic bearing entity, an implementation in which the central office equipment determines, based on a bandwidth configuration upper limit of each traffic bearing entity and the required bandwidth value of the traffic bearing entity, a bandwidth value actually allocated to the traffic bearing entity includes: First, the central office equipment determines the fixed bandwidth value of each traffic bearing entity based on the fixed bandwidth configuration upper limit value of the traffic bearing entity. Then, the central office equipment determines the assured bandwidth value of each traffic bearing entity based on a first remaining bandwidth value of the PON port of the central office equipment and a bandwidth allocation ratio. The first remaining bandwidth value of the PON port of the central office equipment is a difference between the maximum bandwidth value of the PON port of the central office equipment and a cumulative sum of the fixed bandwidth values of the traffic bearing entities.

In an example embodiment, the central office equipment determines, based on the bandwidth configuration upper limit of each traffic bearing entity and the required bandwidth value of the traffic bearing entity, the bandwidth value actually allocated to the traffic bearing entity. In an embodiment, the central office equipment may first determine the fixed bandwidth value, and then determine the assured bandwidth value. When determining the fixed bandwidth value, the central office equipment refers to the fixed bandwidth configuration upper limit value. In addition, when determining the assured bandwidth value, the central office equipment refers to the first remaining bandwidth value of the PON port and the bandwidth allocation ratio. The bandwidth allocation ratio is related to the assured bandwidth configuration upper limit value and the required bandwidth value. Therefore, the bandwidth allocation ratio in this implementation may reflect the bandwidth configuration upper limit of each traffic bearing entity and bandwidth actually required by the traffic bearing entity. In this way, when the central office equipment allocates a part of bandwidth to each traffic bearing entity in the bandwidth allocation manner in this implementation, the traffic bearing entity can fairly obtain an actually allocated bandwidth value. Therefore, bandwidth allocation by the central office equipment is more appropriate.

With reference to the first implementation of the first aspect, in a second implementation of the first aspect of the embodiments of this application, the bandwidth allocation ratio includes a first bandwidth allocation ratio; and that the central office equipment determines the assured bandwidth value of each traffic bearing entity based on a first remaining bandwidth value of the PON port of the central office equipment and a bandwidth allocation ratio includes: The central office equipment multiplies the first remaining bandwidth value of the PON port of the central office equipment by the first bandwidth allocation ratio, to obtain a first weighted bandwidth value of the traffic bearing entity. The central office equipment determines, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity, where the first remaining required bandwidth value of the traffic bearing entity is a difference between the required bandwidth value of the traffic bearing entity and the fixed bandwidth value of the traffic bearing entity. The central office equipment calculates a second remaining bandwidth value of the PON port, where the second remaining bandwidth value of the PON port is equal to a difference between the first remaining bandwidth value of the PON port and a cumulative sum of the first assured bandwidth values of the traffic bearing entities. When the second remaining bandwidth value of the PON port is equal to zero, the central office equipment determines that the assured bandwidth value of the traffic bearing entity is equal to the first assured bandwidth value.

In an example embodiment, the central office equipment determines the assured bandwidth value of each traffic bearing entity based on the first remaining bandwidth value of the PON port of the central office equipment and the bandwidth allocation ratio. In an embodiment, the central office equipment may separately calculate the first weighted bandwidth value of the traffic bearing entity, the assured bandwidth configuration upper limit value of the traffic bearing entity, and the first remaining required bandwidth value of the traffic bearing entity, and determine the minimum value among the three values as the first assured bandwidth value of the traffic bearing entity. In this case, if the second remaining bandwidth value of the PON port is equal to zero, the central office equipment determines that the assured bandwidth value of the traffic bearing entity is equal to the first assured bandwidth value. When the central office equipment determines the first weighted bandwidth value, the central office equipment refers to the first remaining bandwidth value of the PON port of the central office equipment and the first bandwidth allocation ratio of the traffic bearing entity. Therefore, the assured bandwidth value is determined by the central office equipment by comprehensively considering an actual requirement of the traffic bearing entity and the bandwidth configuration upper limit of the traffic bearing entity. In this way, bandwidth can be allocated to each traffic bearing entity more fairly and appropriately.

With reference to the first aspect or the first implementation of the first aspect, in a third implementation of the first aspect of the embodiments of this application, the first bandwidth allocation ratio is equal to a ratio of the assured bandwidth configuration upper limit value of the traffic bearing entity to the cumulative sum of the assured bandwidth configuration upper limit values of the traffic bearing entities.

In this implementation, a manner of determining the first bandwidth allocation ratio is determined. The first bandwidth allocation ratio is related to the assured bandwidth configuration upper limit value of each traffic bearing entity. Therefore, the first bandwidth allocation ratio may reflect the bandwidth configuration upper limit of each traffic bearing entity.

With reference to the second implementation of the first aspect or the third implementation of the first aspect, in a fourth implementation of the first aspect of the embodiments of this application, the bandwidth allocation ratio further includes a second bandwidth allocation ratio; and the method further includes: When the second remaining bandwidth value of the PON port is greater than zero and there are target traffic bearing entities, the central office equipment multiplies the second remaining bandwidth value of the PON port by the second bandwidth allocation ratio, to obtain a second weighted bandwidth value of the target traffic bearing entity, where the target traffic bearing entity is a traffic bearing entity whose second remaining required bandwidth value is greater than zero, and the second remaining required bandwidth value is a difference between the first remaining required bandwidth value of the traffic bearing entity and the first assured bandwidth value of the traffic bearing entity. The central office equipment determines, as a second assured bandwidth value of the target traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity. The central office equipment calculates a third remaining bandwidth value of the PON port, where the third remaining bandwidth value of the PON port is equal to a difference between the second remaining bandwidth value of the PON port and a cumulative sum of the second assured bandwidth values of the target traffic bearing entities. When the third remaining bandwidth value of the PON port is equal to zero, the central office equipment determines that the assured bandwidth value of the target traffic bearing entity is equal to a sum of the first assured bandwidth value and the second assured bandwidth value.

On the basis of the foregoing implementation, this implementation further proposes a case in which the second remaining bandwidth value of the PON port is greater than zero and there are target traffic bearing entities. In this case, the central office equipment may allocate the second assured bandwidth value to each traffic bearing entity with reference to the foregoing implementation until bandwidth of the PON port of the central office equipment is fully allocated or until a bandwidth requirement of the traffic bearing entity is met.

In this manner, the central office equipment may allocate the first assured bandwidth value, the second assured bandwidth value, and the like to each target traffic bearing entity in a manner of allocating small values for a plurality of times. Therefore, bandwidth can be allocated to each target traffic bearing entity more accurately and appropriately in the bandwidth allocation process.

With reference to the fourth implementation of the first aspect, in a fifth implementation of the first aspect of the embodiments of this application, the second bandwidth allocation ratio is equal to a ratio of the assured bandwidth configuration upper limit value of the target traffic bearing entity to a cumulative sum of the assured bandwidth configuration upper limit values of the target traffic bearing entities.

In this implementation, a manner of determining the second bandwidth allocation ratio is determined. The second bandwidth allocation ratio is related to the assured bandwidth configuration upper limit value of the target traffic bearing entity. Therefore, the second bandwidth allocation ratio may reflect the bandwidth configuration upper limit of the target traffic bearing entity. Because the target traffic bearing entity is a traffic bearing entity whose second remaining required bandwidth value is greater than zero, the second bandwidth allocation ratio may be different from the first bandwidth allocation ratio.

With reference to the first implementation of the first aspect, in a sixth implementation of the first aspect of the embodiments of this application, the bandwidth allocation ratio includes a third bandwidth allocation ratio; the bandwidth value actually allocated to the traffic bearing entity includes the fixed bandwidth value of the traffic bearing entity and the assured bandwidth value of the traffic bearing entity; and that the central office equipment determines the assured bandwidth value of each traffic bearing entity based on a first remaining bandwidth value of the PON port of the central office equipment and a bandwidth allocation ratio includes: The central office equipment multiplies the first remaining bandwidth value of the PON port of the central office equipment by the third bandwidth allocation ratio, to obtain the assured bandwidth value of the traffic bearing entity.

This implementation proposes a simpler implementation than the foregoing implementation. The central office equipment directly multiplies the first remaining bandwidth value of the PON port by the third bandwidth allocation ratio of the traffic bearing entity, to obtain the assured bandwidth value of the traffic bearing entity. In this process, the central office equipment determines the assured bandwidth value of each traffic bearing entity by performing bandwidth allocation only one time. The third bandwidth allocation ratio may reflect the bandwidth actually required by each traffic bearing entity and the bandwidth configuration upper limit of the traffic bearing entity. Therefore, in this implementation, bandwidth allocation can be relatively appropriate, and the bandwidth allocation process can be simple and efficient.

With reference to the sixth implementation of the first aspect, in a seventh implementation of the first aspect of the embodiments of this application, the third bandwidth allocation ratio is equal to a ratio of a ratio factor of the traffic bearing entity to a cumulative sum of ratio factors of the traffic bearing entities, the ratio factor of the traffic bearing entity is a smaller value in a first remaining required bandwidth value of the traffic bearing entity and the assured bandwidth configuration upper limit value of the traffic bearing entity, and the first remaining required bandwidth value of the traffic bearing entity is a difference between the required bandwidth value of the traffic bearing entity and the fixed bandwidth value of the traffic bearing entity.

In this implementation, a manner of determining the third bandwidth allocation ratio is determined. The third bandwidth allocation ratio may be determined based on the ratio factor, and the ratio factor is the smaller value in the first remaining required bandwidth value of the traffic bearing entity and the assured bandwidth configuration upper limit value of the traffic bearing entity. In this way, the third allocation ratio may reflect the bandwidth actually required by each traffic bearing entity and the bandwidth configuration upper limit of the traffic bearing entity. Therefore, bandwidth allocation is more appropriate in this implementation.

With reference to any one of the first implementation of the first aspect to the seventh implementation of the first aspect, in an eighth implementation of the first aspect of the embodiments of this application, the bandwidth value actually allocated to the traffic bearing entity further includes a non-assured bandwidth value of the traffic bearing entity or a best-effort bandwidth value of the traffic bearing entity; and after the central office equipment determines the assured bandwidth value of each traffic bearing entity based on the first remaining bandwidth value of the PON port of the central office equipment and the bandwidth allocation ratio, the method further includes: When a difference between the first remaining bandwidth value of the PON port of the central office equipment and a cumulative sum of the assured bandwidth values of the traffic bearing entities is greater than zero, the central office equipment allocates the non-assured bandwidth value or the best-effort bandwidth value to each traffic bearing entity.

In an example embodiment, after the central office equipment allocates the fixed bandwidth value and the assured bandwidth value to each traffic bearing entity, if the PON port of the central office equipment still has bandwidth, the central office equipment may further allocate the non-assured bandwidth value and the best-effort bandwidth value to the traffic bearing entity. Therefore, the central office equipment may fully use remaining bandwidth of the PON port, so that more bandwidth can be allocated to each traffic bearing entity.

With reference to any one of the first aspect or the first implementation of the first aspect to the eighth implementation of the first aspect, in a ninth implementation of the first aspect of the embodiments of this application, before the central office equipment obtains bandwidth requirement information of each traffic bearing entity in each customer premises equipment from the customer premises equipment, the method further includes: The central office equipment sets the bandwidth configuration upper limit for each traffic bearing entity in each customer premises equipment.

In an example embodiment, the bandwidth configuration upper limit of each traffic bearing entity is set by the central office equipment for the traffic bearing entity before a bandwidth allocation period. Therefore, the central office equipment may learn of the fixed bandwidth configuration upper limit value and the assured bandwidth configuration upper limit value of each traffic bearing entity.

With reference to any one of the first aspect or the first implementation of the first aspect to the ninth implementation of the first aspect, in a tenth implementation of the first aspect of the embodiments of this application, that a piece of central office equipment obtains a required bandwidth value of each traffic bearing entity in each customer premises equipment from the customer premises equipment includes: The central office equipment receives a bandwidth allocation request sent by each customer premises equipment, where the bandwidth allocation request includes the required bandwidth value of each traffic bearing entity in the customer premises equipment.

In an example embodiment, the central office equipment obtains the required bandwidth value of each traffic bearing entity by receiving the bandwidth allocation request. In this implementation, the central office equipment may directly obtain the required bandwidth value of each traffic bearing entity. In this way, the central office equipment refers to the required bandwidth value of each traffic bearing entity to determine the bandwidth value actually allocated to the traffic bearing entity.

With reference to any one of the first aspect or the first implementation of the first aspect to the ninth implementation of the first aspect, in an eleventh implementation of the first aspect of the embodiments of this application, that a piece of central office equipment obtains a required bandwidth value of each of a plurality of traffic bearing entities in each customer premises equipment from one or more pieces of customer premises equipment includes: The central office equipment monitors actual traffic information that is of each traffic bearing entity in each customer premises equipment and that is in a preset time range. The central office equipment determines the required bandwidth value of each traffic bearing entity based on the actual traffic information.

This implementation proposes another manner of determining the required bandwidth value of each traffic bearing entity. The central office equipment may determine the required bandwidth value of each traffic bearing entity through traffic monitoring. Therefore, flexibility of the implementation in which the central office equipment determines the required bandwidth value of each traffic bearing entity can be improved.

With reference to any one of the first aspect or the first implementation of the first aspect to the eleventh implementation of the first aspect, in a twelfth implementation of the first aspect of the embodiments of this application, the fixed bandwidth value is zero or greater than zero.

This implementation further proposes a case in which the fixed bandwidth value may be zero. In this case, it is equivalent that some traffic bearing entities do not participate in allocation of fixed bandwidth, but directly participate in allocation of assured bandwidth.

According to a second aspect, an embodiment of this application provides a bandwidth allocation device, including: a transceiver module, configured to obtain a required bandwidth value of each of traffic bearing entities in each customer premises equipment from one or more pieces of customer premises equipment; and a processing module, configured to: when a total sum of a cumulative sum of fixed bandwidth configuration upper limit values of the traffic bearing entities and a cumulative sum of assured bandwidth configuration upper limit values of the traffic bearing entities is greater than a maximum bandwidth value of a passive optical network (PON) port of the central office equipment, determine, based on a bandwidth configuration upper limit of each traffic bearing entity and the required bandwidth value of the traffic bearing entity, a bandwidth value actually allocated to the traffic bearing entity, where the bandwidth configuration upper limit includes the fixed bandwidth configuration upper limit value and the assured bandwidth configuration upper limit value. The transceiver module is further configured to send an authorization message to each customer premises equipment, where the authorization message is used to indicate the bandwidth value actually allocated to each traffic bearing entity in the customer premises equipment.

In this embodiment of this application, the bandwidth allocation device allows the total sum, of the cumulative sum of the fixed bandwidth configuration upper limit values of the traffic bearing entities and the cumulative sum of the assured bandwidth configuration upper limit values of the traffic bearing entities, to be greater than the maximum bandwidth value of the PON port of the bandwidth allocation device. In this case, the bandwidth allocation device may determine, based on the fixed bandwidth configuration upper limit value of each traffic bearing entity, the assured bandwidth configuration upper limit value of the traffic bearing entity, and the required bandwidth value of the traffic bearing entity, the bandwidth value actually allocated to the traffic bearing entity. The bandwidth allocation device considers more factors during bandwidth allocation, and may allocate a part of bandwidth to each traffic bearing entity. This avoids a case in which no bandwidth is allocated to some traffic bearing entities. Therefore, resource allocation is more appropriate.

With reference to the second aspect, in a first implementation of the second aspect of the embodiments of this application, the bandwidth value actually allocated to the traffic bearing entity includes a fixed bandwidth value of the traffic bearing entity and an assured bandwidth value of the traffic bearing entity; and the processing module is further configured to: determine the fixed bandwidth value of each traffic bearing entity based on the fixed bandwidth configuration upper limit value of the traffic bearing entity; and determine the assured bandwidth value of each traffic bearing entity based on a first remaining bandwidth value of the PON port of the central office equipment and a bandwidth allocation ratio, where the first remaining bandwidth value of the PON port of the central office equipment is a difference between the maximum bandwidth value of the PON port of the central office equipment and a cumulative sum of the fixed bandwidth values of the traffic bearing entities.

In an example embodiment, the bandwidth allocation device determines, based on the bandwidth configuration upper limit of each traffic bearing entity and the required bandwidth value of the traffic bearing entity, the bandwidth value actually allocated to the traffic bearing entity. In an embodiment, the bandwidth allocation device may first determine the fixed bandwidth value, and then determine the assured bandwidth value. When determining the fixed bandwidth value, the bandwidth allocation device refers to the fixed bandwidth configuration upper limit value. In addition, when determining the assured bandwidth value, the bandwidth allocation device refers to the first remaining bandwidth value of the PON port and the bandwidth allocation ratio. The bandwidth allocation ratio is related to the assured bandwidth configuration upper limit value and the required bandwidth value. Therefore, the bandwidth allocation ratio in this implementation may reflect the bandwidth configuration upper limit of each traffic bearing entity and bandwidth actually required by the traffic bearing entity. In this way, when the bandwidth allocation device may allocate a part of bandwidth to each traffic bearing entity in the bandwidth allocation manner in this implementation, the traffic bearing entity can fairly obtain an actually allocated bandwidth value. Therefore, bandwidth allocation by the bandwidth allocation device is more appropriate.

With reference to the first implementation of the second aspect, in a second implementation of the second aspect of the embodiments of this application, the bandwidth allocation ratio includes a first bandwidth allocation ratio; and the processing module is further configured to: multiply the first remaining bandwidth value of the PON port of the central office equipment by the first bandwidth allocation ratio, to obtain a first weighted bandwidth value of the traffic bearing entity; determine, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity, where the first remaining required bandwidth value of the traffic bearing entity is a difference between the required bandwidth value of the traffic bearing entity and the fixed bandwidth value of the traffic bearing entity; calculate a second remaining bandwidth value of the PON port, where the second remaining bandwidth value of the PON port is equal to a difference between the first remaining bandwidth value of the PON port and a cumulative sum of the first assured bandwidth values of the traffic bearing entities; and when the second remaining bandwidth value of the PON port is equal to zero, determine that the assured bandwidth value of the traffic bearing entity is equal to the first assured bandwidth value.

In an example embodiment, the bandwidth allocation device determines the assured bandwidth value of each traffic bearing entity based on the first remaining bandwidth value of the PON port and the bandwidth allocation ratio. In an embodiment, the bandwidth allocation device may separately calculate the first weighted bandwidth value of the traffic bearing entity, the assured bandwidth configuration upper limit value of the traffic bearing entity, and the first remaining required bandwidth value of the traffic bearing entity, and determine the minimum value among the three values as the first assured bandwidth value of the traffic bearing entity. In this case, if the second remaining bandwidth value of the PON port is equal to zero, the bandwidth allocation device determines that the assured bandwidth value of the traffic bearing entity is equal to the first assured bandwidth value. When the bandwidth allocation device determines the first weighted bandwidth value, the bandwidth allocation device refers to the first remaining required bandwidth value of the traffic bearing entity and the first bandwidth allocation ratio of the traffic bearing entity. Therefore, the assured bandwidth value is determined by the bandwidth allocation device by comprehensively considering an actual requirement of the traffic bearing entity and the bandwidth configuration upper limit of the traffic bearing entity. In this way, bandwidth can be allocated to each traffic bearing entity more fairly and appropriately.

With reference to the second aspect or the first implementation of the second aspect, in a third implementation of the second aspect of the embodiments of this application, the first bandwidth allocation ratio is equal to a ratio of the assured bandwidth configuration upper limit value of the traffic bearing entity to the cumulative sum of the assured bandwidth configuration upper limit values of the traffic bearing entities.

In this implementation, a manner of determining the first bandwidth allocation ratio is determined. The first bandwidth allocation ratio is related to the assured bandwidth configuration upper limit value of each traffic bearing entity. Therefore, the first bandwidth allocation ratio may reflect the bandwidth configuration upper limit of each traffic bearing entity.

With reference to the second implementation of the second aspect or the third implementation of the second aspect, in a fourth implementation of the second aspect of the embodiments of this application, the bandwidth allocation ratio further includes a second bandwidth allocation ratio; and the processing module is further configured to: when the second remaining bandwidth value of the PON port is greater than zero and there are target traffic bearing entities, multiply the second remaining bandwidth value of the PON port by the second bandwidth allocation ratio, to obtain a second weighted bandwidth value of the target traffic bearing entity, where the target traffic bearing entity is a traffic bearing entity whose second remaining required bandwidth value is greater than zero, and the second remaining required bandwidth value is a difference between the first remaining required bandwidth value of the traffic bearing entity and the first assured bandwidth value of the traffic bearing entity; determine, as a second assured bandwidth value of the target traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity; calculate a third remaining bandwidth value of the PON port, where the third remaining bandwidth value of the PON port is equal to a difference between the second remaining bandwidth value of the PON port and a cumulative sum of the second assured bandwidth values of the target traffic bearing entities; and when the third remaining bandwidth value of the PON port is equal to zero, determine that the assured bandwidth value of the target traffic bearing entity is equal to a sum of the first assured bandwidth value and the second assured bandwidth value.

On the basis of the foregoing implementation, this implementation further proposes a case in which the second remaining bandwidth value of the PON port is greater than zero and there are target traffic bearing entities. In this case, the bandwidth allocation device may allocate the second assured bandwidth value to each traffic bearing entity with reference to the foregoing implementation until bandwidth of the PON port is fully allocated or until a bandwidth requirement of the traffic bearing entity is met. In this manner, the bandwidth allocation device may allocate the first assured bandwidth value, the second assured bandwidth value, and the like to each target traffic bearing entity in a manner of allocating small values for a plurality of times. Therefore, bandwidth can be allocated to each target traffic bearing entity more accurately and appropriately in the bandwidth allocation process.

With reference to the fourth implementation of the second aspect, in a fifth implementation of the second aspect of the embodiments of this application, the second bandwidth allocation ratio is equal to a ratio of the assured bandwidth configuration upper limit value of the target traffic bearing entity to a cumulative sum of the assured bandwidth configuration upper limit values of the target traffic bearing entities.

In this implementation, a manner of determining the second bandwidth allocation ratio is determined. The second bandwidth allocation ratio is related to the assured bandwidth configuration upper limit value of the target traffic bearing entity. Therefore, the second bandwidth allocation ratio may reflect the bandwidth configuration upper limit of the target traffic bearing entity. Because the target traffic bearing entity is a traffic bearing entity whose second remaining required bandwidth value is greater than zero, the second bandwidth allocation ratio may be different from the first bandwidth allocation ratio.

With reference to the first implementation of the second aspect, in a sixth implementation of the second aspect of the embodiments of this application, the bandwidth allocation ratio includes a third bandwidth allocation ratio; the bandwidth value actually allocated to the traffic bearing entity includes the fixed bandwidth value of the traffic bearing entity and the assured bandwidth value of the traffic bearing entity; and the processing module is further configured to multiply the first remaining bandwidth value of the PON port of the central office equipment by the third bandwidth allocation ratio, to obtain the assured bandwidth value of the traffic bearing entity.

This implementation proposes a simpler implementation than the foregoing implementation. The bandwidth allocation device directly multiplies the first remaining bandwidth value of the PON port by the third bandwidth allocation ratio of the traffic bearing entity, to obtain the assured bandwidth value of the traffic bearing entity. In this process, the bandwidth allocation device determines the assured bandwidth value of each traffic bearing entity by performing bandwidth allocation only one time. The third allocation ratio may reflect the bandwidth actually required by each traffic bearing entity and the bandwidth configuration upper limit of the traffic bearing entity. Therefore, in this implementation, bandwidth allocation can be relatively appropriate, and the bandwidth allocation process can be simple and efficient.

With reference to the sixth implementation of the second aspect, in a seventh implementation of the second aspect of the embodiments of this application, the third bandwidth allocation ratio is equal to a ratio of a ratio factor of the traffic bearing entity to a cumulative sum of ratio factors of the traffic bearing entities, the ratio factor of the traffic bearing entity is a smaller value in a first remaining required bandwidth value of the traffic bearing entity and the assured bandwidth configuration upper limit value of the traffic bearing entity, and the first remaining required bandwidth value of the traffic bearing entity is a difference between the required bandwidth value of the traffic bearing entity and the fixed bandwidth value of the traffic bearing entity.

In this implementation, a manner of determining the third bandwidth allocation ratio is determined. The third bandwidth allocation ratio may be determined based on the ratio factor, and the ratio factor is the smaller value in the first remaining required bandwidth value of the traffic bearing entity and the assured bandwidth configuration upper limit value of the traffic bearing entity. In this way, the third allocation ratio reflects the bandwidth actually required by each traffic bearing entity and the bandwidth configuration upper limit of the traffic bearing entity. Therefore, bandwidth allocation is more appropriate in this implementation.

With reference to any one of the first implementation of the second aspect to the seventh implementation of the second aspect, in an eighth implementation of the second aspect of the embodiments of this application, the bandwidth value actually allocated to the traffic bearing entity further includes a non-assured bandwidth value of the traffic bearing entity or a best-effort bandwidth value of the traffic bearing entity; and the processing module is further configured to: when a difference between the first remaining bandwidth value of the PON port of the central office equipment and a cumulative sum of the assured bandwidth values of the traffic bearing entities is greater than zero, allocate the non-assured bandwidth value or the best-effort bandwidth value to each traffic bearing entity.

In an example embodiment, after the bandwidth allocation device allocates the fixed bandwidth value and the assured bandwidth value to each traffic bearing entity, if the PON port of the bandwidth allocation device still has bandwidth, the bandwidth allocation device may further allocate the non-assured bandwidth value and the best-effort bandwidth value to the traffic bearing entity. Therefore, the bandwidth allocation device may fully use remaining bandwidth of the PON port, so that more bandwidth can be allocated to each traffic bearing entity.

With reference to any one of the second aspect or the first implementation of the second aspect to the eighth implementation of the second aspect, in a ninth implementation of the second aspect of the embodiments of this application, the processing module is further configured to set the bandwidth configuration upper limit for each traffic bearing entity in each customer premises equipment.

In an example embodiment, the bandwidth configuration upper limit of each traffic bearing entity is set by the bandwidth allocation device for the traffic bearing entity before a bandwidth allocation period. Therefore, the bandwidth allocation device may learn of the fixed bandwidth configuration upper limit value and the assured bandwidth configuration upper limit value of each traffic bearing entity.

With reference to any one of the second aspect or the first implementation of the second aspect to the ninth implementation of the second aspect, in a tenth implementation of the second aspect of the embodiments of this application, the transceiver module is further configured to receive a bandwidth allocation request sent by each customer premises equipment, where the bandwidth allocation request includes the required bandwidth value of each traffic bearing entity in the customer premises equipment.

In an example embodiment, the bandwidth allocation device obtains the required bandwidth value of each traffic bearing entity by receiving the bandwidth allocation request. In this implementation, the bandwidth allocation device may directly obtain the required bandwidth value of each traffic bearing entity. In this way, the bandwidth allocation device refers to the required bandwidth value of each traffic bearing entity to determine the bandwidth value actually allocated to the traffic bearing entity.

With reference to any one of the second aspect or the first implementation of the second aspect to the ninth implementation of the second aspect, in an eleventh implementation of the second aspect of the embodiments of this application, bandwidth requirement information of the traffic bearing entity includes actual traffic information of the traffic bearing entity; and the transceiver module is further configured to: monitor actual traffic information that is of each traffic bearing entity in each customer premises equipment and that is in a preset time range; and determine the required bandwidth value of each traffic bearing entity based on the actual traffic information.

This implementation proposes another manner of determining the required bandwidth value of each traffic bearing entity. The bandwidth allocation device may determine the required bandwidth value of each traffic bearing entity through traffic monitoring. Therefore, flexibility of the implementation in which the bandwidth allocation device determines the required bandwidth value of each traffic bearing entity can be improved.

With reference to any one of the second aspect or the first implementation of the second aspect to the eleventh implementation of the second aspect, in a twelfth implementation of the second aspect of the embodiments of this application, the fixed bandwidth value is zero or greater than zero.

This implementation further proposes a case in which the fixed bandwidth value may be zero. In this case, it is equivalent that some traffic bearing entities do not participate in allocation of fixed bandwidth, but directly participate in allocation of assured bandwidth.

According to a third aspect, an embodiment of this application provides a bandwidth allocation device, where the bandwidth allocation device is a piece central office equipment or a chip or a group of chips in the central office equipment, the bandwidth allocation device includes a processor, and the processor is configured to perform the method described in any one of the first aspect or the implementations of the first aspect.

With reference to the third aspect, in a first implementation of the third aspect of the embodiments of this application, the bandwidth allocation device further includes a memory, and the memory is configured to store program instructions or data, so that the processor invokes the program instructions or the data in the memory to perform the method described in any one of the first aspect or the implementations of the first aspect.

With reference to the third aspect or the first implementation of the third aspect, in a second implementation of the third aspect of the embodiments of this application, when the bandwidth allocation device is a chip or a group of chips in the central office equipment, the bandwidth allocation device further includes a chip interface, configured to collect actual traffic of a customer premises equipment or a status report of the customer premises equipment.

According to a fourth aspect, this application provides a chip system, where the chip system includes a processor, configured to support a bandwidth allocation device in implementing a function in any one of the first aspect or the implementations of the first aspect, for example, sending or processing data and/or information in the foregoing method. In an example embodiment, the chip system further includes a memory. The memory is configured to store program instructions and data that are necessary for the communications device. The chip system may include a chip, or may include a chip and another discrete component.

According to a fifth aspect, an embodiment of this application provides a computer program product including instructions. When the computer program product runs on a computer, the computer performs the method provided in any one of the first aspect or the implementations of the first aspect.

According to a sixth aspect, an embodiment of this application provides a computer-readable storage medium including instructions. When the instructions are run on a computer, the computer is enabled to perform the method described in any one of the first aspect or the implementations of the first aspect.

It can be learned from the foregoing technical solutions that, embodiments of this application have the following advantages:

In the embodiments of this application, the central office equipment allows the total sum, of the cumulative sum of the fixed bandwidth configuration upper limit values of the traffic bearing entities and the cumulative sum of the assured bandwidth configuration upper limit values of the traffic bearing entities, to be greater than the maximum bandwidth value of the PON port of the central office equipment. In this case, the central office equipment may determine, based on the fixed bandwidth configuration upper limit value of each traffic bearing entity, the assured bandwidth configuration upper limit value of the traffic bearing entity, and the required bandwidth value of the traffic bearing entity, the bandwidth value actually allocated to the traffic bearing entity. The central office equipment considers more factors during bandwidth allocation, and may allocate a part of bandwidth to each traffic bearing entity. This avoids a case in which no bandwidth is allocated to some traffic bearing entities. Therefore, resource allocation is more appropriate.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show merely some embodiments of this application.

DESCRIPTION OF EMBODIMENTS

Figure 1:
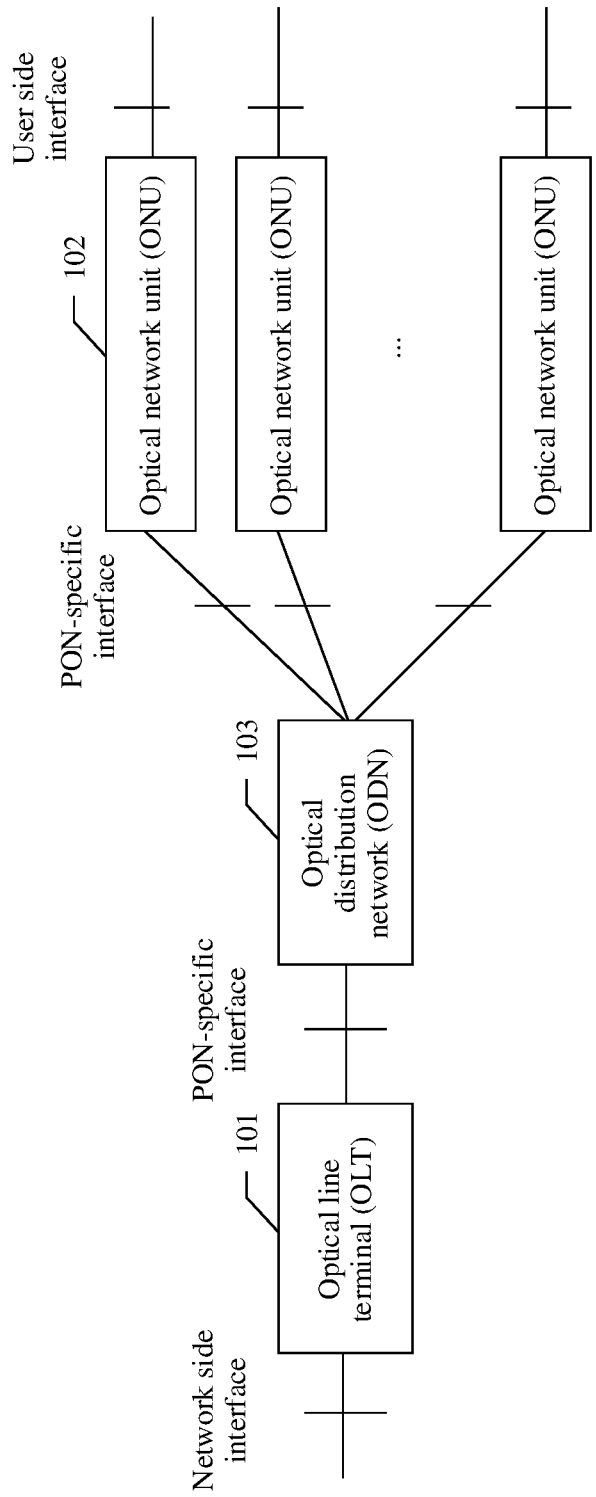
FIG. 1 is a schematic diagram of a network architecture of a bandwidth allocation method according to an embodiment of this application.

Embodiments of this application provide a bandwidth allocation method and a related device, to improve appropriateness of resource allocation.

In the specification, claims, and accompanying drawings of this application, the terms "first", "second", "third", "fourth", and the like (if any) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The following describes some terms in the present disclosure.

Bandwidth allocation is an upstream transmission opportunity allocated by a piece of central office equipment to a traffic bearing entity in a piece of customer premises equipment, and the transmission opportunity is within a specified time period in upstream transmission.

Dynamic bandwidth assignment (DBA) is a mechanism in which upstream bandwidth can be dynamically allocated within a time interval at a microsecond or millisecond level, and is a process in which the central office equipment may allocate upstream PON bandwidth to a plurality of traffic bearing entities in the customer premises equipment based on a dynamic status indication or a configured traffic contract of the customer premises equipment.

Fixed bandwidth (FB) is bandwidth reserved for a specified traffic bearing entity in the customer premises equipment. Generally, even if the traffic bearing entity does not have an upstream service flow, the central office equipment needs to allocate the fixed bandwidth to the traffic bearing entity.

Assured bandwidth (AB) is bandwidth of which the customer premises equipment is assured, and is authorized by the central office equipment based on report information of the customer premises equipment. When actual service traffic of the customer premises equipment does not reach the assured bandwidth, the DBA mechanism of the central office equipment can be used to allocate remaining bandwidth of the customer premises equipment to another customer premises equipment or another traffic bearing entity.

Non-assured bandwidth (NAB) is also referred to as non-guaranteed bandwidth, and is bandwidth allocated by the central office equipment to each traffic bearing entity based on a sum of a fixed bandwidth value and an assured bandwidth value when a PON port of the central office equipment has remaining bandwidth after the central office equipment allocates the fixed bandwidth and the assured bandwidth to the traffic bearing entity in the customer premises equipment.

Best-effort bandwidth (BEB) is bandwidth allocated by the central office equipment to each traffic bearing entity when the PON port of the central office equipment has remaining bandwidth after the central office equipment allocates the fixed bandwidth, the assured bandwidth, and the non-assured bandwidth.

The following describes a system architecture and an application scenario to which the embodiments of this application are applied.

The bandwidth allocation method proposed in the embodiments of this application is mainly applied to a point-to-multipoint single-fiber bidirectional PON network system. In some embodiments, the PON system may be a gigabit-capable passive optical network (GPON) system, an Ethernet passive optical network (EPON) system, or a system integrated with a GPON system and an EPON system. This is not specifically limited herein. The PON network system includes a piece of central office equipment and a piece of customer premises equipment. The central office equipment may be an optical line terminal (OLT), and the customer premises equipment may be an optical network unit (ONU) or an optical network terminal (ONT). As shown in FIG. 1, in the PON network system, an optical line terminal (OLT) 101 is connected to a network side through a network side interface, and an optical network unit (ONU) 102 is connected to a user side through a user side interface. In addition, the PON network system further includes an optical distribution network (ODN) 103. The optical distribution network (ODN) 103 may be separately connected to the optical line terminal (OLT) 101 and the optical network unit (ONU) 102 through PON-specific interfaces, to transmit data between the optical line terminal (OLT) 101 and a plurality of optical network units (ONUs) 102.

It should be understood that the optical network unit (ONU) 102 in the PON network system may be replaced with the optical network terminal (ONT). This is not specifically limited herein. When the customer premises equipment is the optical network terminal (ONT), the optical network terminal (ONT) is directly a terminal device in a home of a user. When the customer premises equipment is the optical network unit (ONU) 102, another network such as the Ethernet further exists between the optical network unit (ONU) 102 and a terminal device in a home of a user. In this embodiment and subsequent embodiments, the customer premises equipment is merely used as an example for description.

In addition, in the embodiments, the bandwidth allocation method may be applied to a scenario in which the central office equipment allocates bandwidth to a traffic bearing entity, a transmission container (T-CONT), in the customer premises equipment by using the DBA mechanism. For example, when the central office equipment learns of a bandwidth requirement of each traffic bearing entity in the customer premises equipment, the central office equipment may allocate bandwidth to the traffic bearing entity in the customer premises equipment by using the bandwidth allocation method proposed in the embodiments of this application. The traffic bearing entity is located in the customer premises equipment. Generally, a customer premises equipment may include one or more traffic bearing entities. The traffic bearing entity is also referred to as a transmission container or a service container, and is an upstream traffic scheduling unit of the DBA mechanism. The traffic bearing entity is described in detail below.

The central office equipment in the embodiments of this application may be the optical line terminal (OLT) or a chip in the optical line terminal (OLT). This is not specifically limited herein. Either being a device or a chip, the central office equipment can be manufactured, sold or used as an independent product. In this embodiment and following embodiments, only the central office equipment is used as an example for description.

Figure 2:
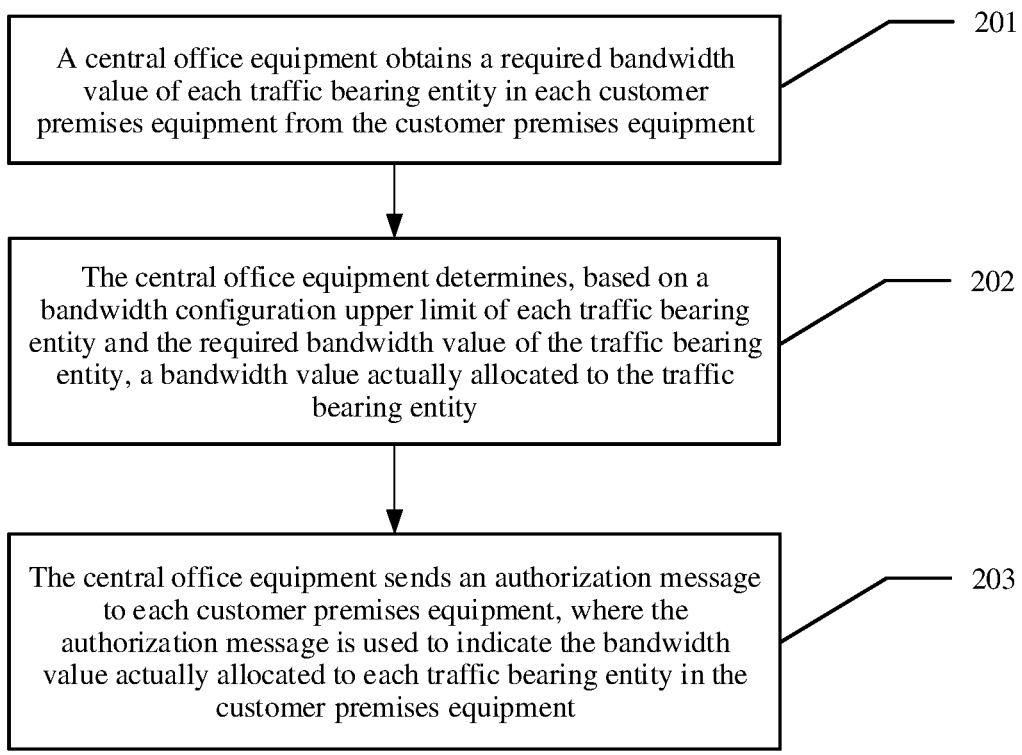
FIG. 2 is a flowchart of a bandwidth allocation method according to an embodiment of this application.

To facilitate better understanding of the solutions proposed in the embodiments of this application, the following describes a main process of the bandwidth allocation method in some embodiments. As shown in FIG. 2, steps performed by the central office equipment in a bandwidth allocation period include the following:

201. The central office equipment obtains a required bandwidth value of each traffic bearing entity in each customer premises equipment from the customer premises equipment.

In this embodiment, the central office equipment is connected to one or more pieces of customer premises equipment, and the customer premises equipment includes one or more traffic bearing entities. Generally, before the central office equipment allocates bandwidth to each traffic bearing entity in the customer premises equipment, the central office equipment needs to learn of the required bandwidth value of each traffic bearing entity in each customer premises equipment. The required bandwidth value is used to indicate bandwidth required by the traffic bearing entity. In this way, the central office equipment can allocate bandwidth to each traffic bearing entity more fairly and appropriately. In this embodiment, the central office equipment may obtain the required bandwidth value of each traffic bearing entity in a plurality of implementations as follows:

1. The central office equipment obtains the required bandwidth value by receiving a bandwidth allocation request.

In this implementation, the central office equipment may receive a bandwidth allocation request sent by each customer premises equipment, where the bandwidth allocation request includes the required bandwidth value of each traffic bearing entity in the customer premises equipment. In some implementations, the bandwidth allocation request includes a status report (SR). The status report may indicate the required bandwidth value of each traffic bearing entity. The status report may further indicate identifier information of each traffic bearing entity, for example, an allocation identifier (Alloc-ID). This is not specifically limited herein. The identifier information is used to establish a correspondence between a traffic bearing entity and a required bandwidth value of the traffic bearing entity, so that the central office equipment can distinguish between required bandwidth values of different traffic bearing entities.

2. The central office equipment obtains the required bandwidth value by monitoring actual traffic information.

In this implementation, the central office equipment may monitor actual traffic information that is of each traffic bearing entity in each customer premises equipment and that is in a preset time range, and then determine the required bandwidth value of each traffic bearing entity based on the actual traffic information. In other words, the central office equipment may obtain the required bandwidth value of each traffic bearing entity through traffic monitoring (TM). To be specific, the central office equipment indirectly obtains an upstream required bandwidth value of each traffic bearing entity in the customer premises equipment by monitoring received upstream traffic (an idle GEM frame), and the customer premises equipment does not need to report information to the central office equipment. In addition, it should be noted that the preset time range in this implementation is generally set by the central office equipment, and may be specifically one or several bandwidth allocation periods before the current bandwidth allocation period. Certainly, the preset time range may be adjusted based on an actual application scenario. This is not specifically limited herein. When the preset time range is several bandwidth allocation periods before the current bandwidth allocation period, the actual traffic information in the preset time range is a total sum of upstream traffic in the several bandwidth allocation periods. Then, the central office equipment averages the total sum of the upstream traffic in the several bandwidth allocation periods to determine the required bandwidth value of each traffic bearing entity.

In this embodiment, after the central office equipment learns of the required bandwidth value of each traffic bearing entity in each customer premises equipment, the central office equipment analyzes a bandwidth configuration upper limit of the traffic bearing entity. The bandwidth configuration upper limit is set by the central office equipment before the bandwidth allocation period, and the bandwidth configuration upper limit includes a fixed bandwidth configuration upper limit value and an assured bandwidth configuration upper limit value. In addition, fixed bandwidth configuration upper limit values of different traffic bearing entities may be different, and assured bandwidth configuration upper limit values of different traffic bearing entities may also be different. This is not specifically limited herein.

In this case, the central office equipment may calculate a cumulative sum of fixed bandwidth configuration upper limit values of the traffic bearing entities to which bandwidth needs to be allocated, and a cumulative sum of assured bandwidth configuration upper limit values of the traffic bearing entities. The central office equipment performs step 202 when a total sum of the cumulative sum of the fixed bandwidth configuration upper limit values of the traffic bearing entities and the cumulative sum of the assured bandwidth configuration upper limit values of the traffic bearing entities is greater than a maximum bandwidth value of a PON port of the central office equipment.

202. The central office equipment determines, based on the bandwidth configuration upper limit of each traffic bearing entity and the required bandwidth value of the traffic bearing entity, a bandwidth value actually allocated to the traffic bearing entity.

In this embodiment, when the total sum of the cumulative sum of the fixed bandwidth configuration upper limit values of the traffic bearing entities and the cumulative sum of the assured bandwidth configuration upper limit values of the traffic bearing entities is greater than the maximum bandwidth value of the PON port of the central office equipment, the central office equipment determines, based on the bandwidth configuration upper limit of each traffic bearing entity and the required bandwidth value of the traffic bearing entity, the bandwidth value actually allocated to the traffic bearing entity.

The PON port is also referred to as a PON-specific interface, and is an interface between the central office equipment and an optical distribution network. The central office equipment has one or more PON ports. In addition, there is an upper limit for bandwidth that can be allocated by each PON port. The upper limit is referred to as a maximum bandwidth value of the PON port in this embodiment and subsequent embodiments. Generally, maximum bandwidth values of a plurality of PON ports of a piece of central office equipment are the same. However, in a system integrated with a GPON system and an EPON system, maximum bandwidth values of different PON ports may be different. This is not specifically limited herein.

In this embodiment, the bandwidth value that is actually allocated to each traffic bearing entity and that is determined by the central office equipment includes a fixed bandwidth value of the traffic bearing entity and an assured bandwidth value of the traffic bearing entity. The central office equipment may first determine the fixed bandwidth value of each traffic bearing entity based on the fixed bandwidth configuration upper limit value of the traffic bearing entity. Then, the central office equipment determines the assured bandwidth value of each traffic bearing entity based on a first remaining bandwidth value of the PON port of the central office equipment and a bandwidth allocation ratio. The first remaining bandwidth value of the PON port of the central office equipment is a difference between the maximum bandwidth value of the PON port of the central office equipment and a cumulative sum of the fixed bandwidth values of the traffic bearing entities.

The bandwidth allocation ratio is a decimal greater than 0 and less than 1. In different application scenarios, the central office equipment may determine the bandwidth allocation ratio in different calculation manners. The bandwidth allocation ratio is described in detail below by using different application scenarios.

Optionally, the fixed bandwidth value is zero or greater than zero. When the fixed bandwidth value is zero, it is equivalent that the traffic bearing entity does not participate in allocation of fixed bandwidth.

Optionally, the bandwidth value actually allocated to the traffic bearing entity further includes non-assured bandwidth of the traffic bearing entity or best-effort bandwidth of the traffic bearing entity. In an embodiment, when a difference between the first remaining bandwidth value of the PON port of the central office equipment and a cumulative sum of the assured bandwidth values of the traffic bearing entities is greater than zero, the central office equipment further allocates the non-assured bandwidth or the best-effort bandwidth to each traffic bearing entity based on the foregoing allocation.

203. The central office equipment sends an authorization message to each customer premises equipment, where the authorization message is used to indicate the bandwidth value actually allocated to each traffic bearing entity in the customer premises equipment.

In this embodiment, after the central office equipment determines the bandwidth value actually allocated to each traffic bearing entity, the central office equipment may send the authorization message to the customer premises equipment. The authorization message includes at least the bandwidth value actually allocated to each traffic bearing entity and the identifier information of the traffic bearing entity. In this way, after receiving the authorization message, the customer premises equipment can determine, based on the authorization message, the bandwidth value actually allocated to each traffic bearing entity in the customer premises equipment.

This embodiment proposes the following manner: When the total sum of the cumulative sum of the fixed bandwidth configuration upper limit values of the traffic bearing entities and the cumulative sum of the assured bandwidth configuration upper limit values of the traffic bearing entities is greater than the maximum bandwidth value of the PON port of the central office equipment, the central office equipment allocates bandwidth to each traffic bearing entity in the customer premises equipment. In this case, the central office equipment may determine, based on the fixed bandwidth configuration upper limit value of each traffic bearing entity, the assured bandwidth configuration upper limit value of the traffic bearing entity, and the required bandwidth value of the traffic bearing entity, the bandwidth value actually allocated to the traffic bearing entity. The central office equipment considers more factors during bandwidth allocation, and may allocate a part of bandwidth to each traffic bearing entity. This avoids a case in which no bandwidth to be allocated to some traffic bearing entities. Therefore, resource allocation is more appropriate.

Figure 3:
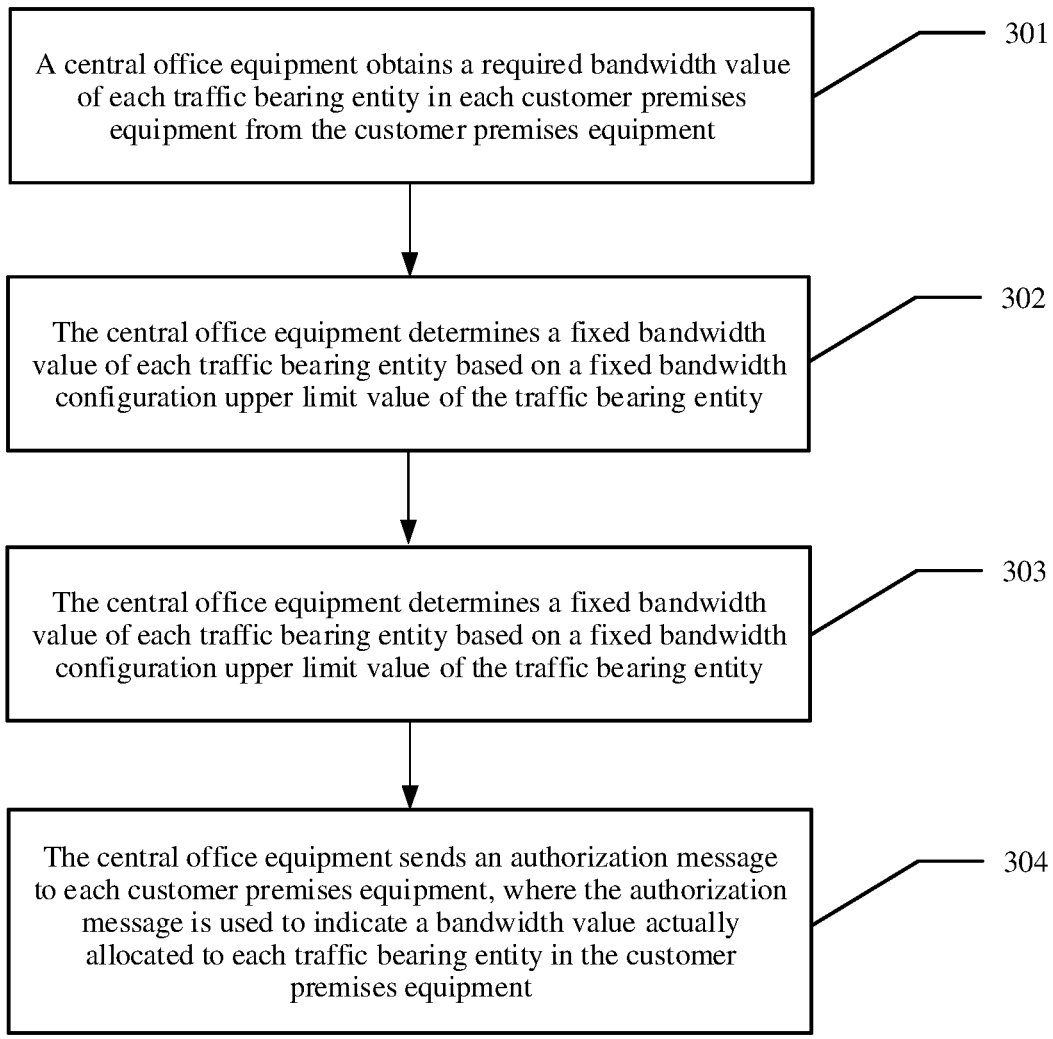
FIG. 3 is another flowchart of a bandwidth allocation method according to an embodiment of this application.

The foregoing briefly describes the process of the bandwidth allocation method in this embodiment. The following further describes the bandwidth allocation method by using a specific application scenario. As shown in FIG. 3, steps performed by the central office equipment in the bandwidth allocation method include the following:

301. The central office equipment obtains a required bandwidth value of each traffic bearing entity in each customer premises equipment from the customer premises equipment.

In this embodiment, the central office equipment may obtain the required bandwidth value of each traffic bearing entity by receiving a bandwidth allocation request or monitoring actual traffic information. This step is similar to the foregoing step 201.

In this embodiment, after the central office equipment learns of the required bandwidth value of each traffic bearing entity in each customer premises equipment, the central office equipment analyzes a bandwidth configuration upper limit of the traffic bearing entity. The central office equipment performs step 302 when a total sum of a cumulative sum of fixed bandwidth configuration upper limit values of the traffic bearing entities and a cumulative sum of assured bandwidth configuration upper limit values of the traffic bearing entities is greater than a maximum bandwidth value of a PON port of the central office equipment.

302. The central office equipment determines a fixed bandwidth value of each traffic bearing entity based on the fixed bandwidth configuration upper limit value of the traffic bearing entity.

In this embodiment, when the total sum of the cumulative sum of the fixed bandwidth configuration upper limit values of the traffic bearing entities and the cumulative sum of the assured bandwidth configuration upper limit values of the traffic bearing entities is greater than the maximum bandwidth value of the passive optical network (PON) port of the central office equipment, the central office equipment may determine the fixed bandwidth value of each traffic bearing entity based on the fixed bandwidth configuration upper limit value of the traffic bearing entity. Generally, a required bandwidth value of a traffic bearing entity is usually greater than a fixed bandwidth configuration upper limit value of the traffic bearing entity. Therefore, the central office equipment may directly allocate fixed bandwidth to the traffic bearing entity based on the fixed bandwidth configuration upper limit value of the traffic bearing entity. In other words, a fixed bandwidth value allocated to the traffic bearing entity is equal to the fixed bandwidth configuration upper limit value of the traffic bearing entity. However, there is also the following case: When the traffic bearing entity is of a first type (type 1), the traffic bearing entity may not need to participate in allocation of the fixed bandwidth, but directly participates in allocation of assured bandwidth. In other words, the fixed bandwidth value allocated to the traffic bearing entity may be considered to be zero.

In this embodiment, after the central office equipment determines the fixed bandwidth values of all the traffic bearing entities in the customer premises equipment, the central office equipment may start to decide how to allocate an assured bandwidth value to each traffic bearing entity in the customer premises equipment. The central office equipment performs step 303.

303. The central office equipment determines the assured bandwidth value of each traffic bearing entity based on a first remaining bandwidth value of the PON port of the central office equipment and a bandwidth allocation ratio, where the bandwidth allocation ratio includes a first bandwidth allocation ratio or a second bandwidth allocation ratio.

In this embodiment, the first remaining bandwidth value of the PON port of the central office equipment is a difference between the maximum bandwidth value of the PON port of the central office equipment and a cumulative sum of the fixed bandwidth values of the traffic bearing entities. The maximum bandwidth value of the PON port has been described above in detail in the foregoing step 202.

In this embodiment, in some application scenarios, the central office equipment may determine the assured bandwidth value of each traffic bearing entity by using only the first bandwidth allocation ratio. For details, refer to related descriptions in an embodiment corresponding to FIG. 4 below. In some other application scenarios, the central office equipment needs to determine a first assured bandwidth value of each traffic bearing entity by using the first bandwidth allocation ratio, and then determine a second assured bandwidth value of the traffic bearing entity by using the second bandwidth allocation ratio. Then, the central office equipment determines the assured bandwidth value of each traffic bearing entity based on the first assured bandwidth value of the traffic bearing entity and the second assured bandwidth value of the traffic bearing entity. For details, refer to related descriptions in an embodiment corresponding to FIG. 5A and FIG. 5B below.

304. The central office equipment sends an authorization message to each customer premises equipment, where the authorization message is used to indicate a bandwidth value actually allocated to each traffic bearing entity in the customer premises equipment.

In this embodiment, step 304 is similar to the foregoing step 203.

In this embodiment, the central office equipment may first determine the fixed bandwidth value of each traffic bearing entity, and then determine the assured bandwidth value of the traffic bearing entity based on the first bandwidth allocation ratio or the second bandwidth allocation ratio. The first bandwidth allocation ratio and the second bandwidth allocation ratio may fairly reflect bandwidth actually required by each traffic bearing entity. In this way, the central office equipment can allocate bandwidth to each traffic bearing entity, and can also allocate the bandwidth to the traffic bearing entity based on a specified ratio. Therefore, resource allocation is more appropriate.

The bandwidth allocation ratio in step 303 may be determined in different manners in different scenarios. In an embodiment, the bandwidth allocation ratio may include the first bandwidth allocation ratio and the second bandwidth allocation ratio. The following first describes a case in which the bandwidth allocation ratio is the first bandwidth allocation ratio. For details, refer to FIG. 4.

In this embodiment, a process in which the central office equipment determines the assured bandwidth value of each traffic bearing entity based on the first remaining bandwidth value of the PON port of the central office equipment and the first bandwidth allocation ratio may include the following steps.

401. The central office equipment multiplies the first remaining bandwidth value of the PON port of the central office equipment by the first bandwidth allocation ratio, to obtain a first weighted bandwidth value of the traffic bearing entity.

The first remaining bandwidth value of the PON port of the central office equipment is the difference between the maximum bandwidth value of the PON port of the central office equipment and the cumulative sum of the fixed bandwidth values of the traffic bearing entities.

In addition, the first bandwidth allocation ratio is equal to a ratio of the assured bandwidth configuration upper limit value of the traffic bearing entity to the cumulative sum of the assured bandwidth configuration upper limit values of the traffic bearing entities. For ease of understanding, an example in which the central office equipment manages only three traffic bearing entities is used for description. In this case, it is assumed that an assured bandwidth configuration upper limit value of a first traffic bearing entity is 0.3 Gbps, an assured bandwidth configuration upper limit value of a second traffic bearing entity is 0.4 Gbps, and an assured bandwidth configuration upper limit value of a third traffic bearing entity is 0.6 Gbps. In this case, the central office equipment may determine, through calculation, that a cumulative sum of the assured bandwidth configuration upper limit values of the three traffic bearing entities is 0.3+0.4+0.6=1.3 Gbps. Therefore, the central office equipment may further determine, through calculation, that a first bandwidth allocation ratio of the first traffic bearing entity is 0.3/1.3=0.2308. Similarly, the central office equipment may also calculate a first bandwidth allocation ratio of the second traffic bearing entity and a first bandwidth allocation ratio of the third traffic bearing entity.

In this embodiment, when the central office equipment determines the first remaining bandwidth value of the PON port of the central office equipment and a first bandwidth allocation ratio of a traffic bearing entity, the central office equipment may calculate a first weighted bandwidth value of the traffic bearing entity. Because first bandwidth allocation ratios of different traffic bearing entities are different, calculated first weighted bandwidth values of the different traffic bearing entities are also different.

402. The central office equipment determines, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity.

The first remaining required bandwidth value of the traffic bearing entity is a difference between the required bandwidth value of the traffic bearing entity and the fixed bandwidth value of the traffic bearing entity. For the fixed bandwidth value of the traffic bearing entity, refer to the descriptions in the foregoing step 302. The first remaining required bandwidth value may be used to indicate a bandwidth value required by the traffic bearing entity in addition to the fixed bandwidth value. The first remaining bandwidth value of the PON port is used to allocate bandwidth based on the first allocation ratio, to meet a bandwidth requirement of each traffic bearing entity as much as possible.

It should be noted a time sequence between the step that the central office equipment determines the first weighted bandwidth value of the traffic bearing entity and the step that the central office equipment determines the first remaining required bandwidth value of the traffic bearing entity is not limited.

In this embodiment, the central office equipment determines, as the first assured bandwidth value of the traffic bearing entity, the minimum value among the first weighted bandwidth value of the traffic bearing entity, the assured bandwidth configuration upper limit value of the traffic bearing entity, and the first remaining required bandwidth value of the traffic bearing entity. This can avoid a case in which bandwidth that may be allocated to another traffic bearing entity is decreased because a traffic bearing entity abnormally applies for very high bandwidth. It should be noted that the first assured bandwidth value is not necessarily the assured bandwidth value actually allocated to the traffic bearing entity. The central office equipment further needs to determine whether the first remaining bandwidth value of the PON port of the central office equipment can be fully allocated and the bandwidth requirement of each traffic bearing entity can be met when it is assumed that the first remaining bandwidth value of the PON port of the central office equipment is allocated based on the first assured bandwidth value. Therefore, the central office equipment performs step 403.

403. The central office equipment calculates a second remaining bandwidth value of the PON port.

The second remaining bandwidth value of the PON port is equal to a difference between the first remaining bandwidth value of the PON port and a cumulative sum of the first assured bandwidth values of the traffic bearing entities. In addition, when the second remaining bandwidth value of the PON port is equal to zero, the central office equipment performs step 404.

404. The central office equipment determines that the assured bandwidth value of the traffic bearing entity is equal to the first assured bandwidth value.

In this embodiment, the second remaining bandwidth value of the PON port of the central office equipment is equal to zero. In other words, the difference between the first remaining bandwidth value of the PON port of the central office equipment and the cumulative sum of the first assured bandwidth values of the traffic bearing entities is equal to zero. Therefore, when the central office equipment allocates the assured bandwidth value to each traffic bearing entity based on the first assured bandwidth value, the central office equipment may exactly allocate the first remaining bandwidth value of the PON port to the traffic bearing entity based on the first bandwidth allocation ratio. In this case, if the assured bandwidth value actually allocated to the traffic bearing entity is determined based on the first assured bandwidth value, the PON port of the central office equipment has no remaining bandwidth. Therefore, low bandwidth utilization caused because the PON port of the central office equipment has much remaining bandwidth can be avoided. In addition, the assured bandwidth is also allocated to each traffic bearing entity based on the first bandwidth allocation ratio. In this way, bandwidth can be more fairly allocated to each traffic bearing entity.

To facilitate further understanding, the following describes in detail the foregoing bandwidth allocation method by using exemplary values.

In this embodiment, an example in which the central office equipment is an OLT, the OLT has only one PON port, and a maximum bandwidth value of the PON port is 1.25 Gbps is used for description. In addition, an example in which the customer premises equipment is an ONT and the ONT has only three traffic bearing entities T-CONTs is used for description. In addition, an assumption that the OLT is connected to only one ONT further needs to be made. However, it should be understood that, generally, a piece of central office equipment OLT includes a plurality of PON ports, one PON port is usually connected to a plurality of ONTs, and there are usually more than three T-CONTs in each ONT. Examples in this embodiment and examples in subsequent embodiments are merely used to facilitate calculation when the bandwidth allocation method is described, and a quantity of PON ports, ONTs, or T-CONTs is not limited.

As shown in Table 1, it is assumed that the OLT receives a bandwidth allocation request of the ONT, and the bandwidth allocation request indicates required bandwidth values of the three T-CONTs in the ONT. The required bandwidth value of a T-CONT1 is 0.5, the required bandwidth value of a T-CONT2 is 0.5, and the required bandwidth value of a T-CONT3 is 1.2. Therefore, the OLT may learn, through calculation, that the required bandwidth values requested by all the T-CONTs in the ONT are 2.2 Gbps in total. In this case, because a bandwidth configuration upper limit of each T-CONT has been set before a current bandwidth allocation period, the OLT may learn of the bandwidth configuration upper limits of the three T-CONTs. As shown in the third row in Table 1, the second column in the third row is used as an example. The bandwidth configuration upper limit of the T-CONT1 is "(0.1+0.3; 0.4)". A fixed bandwidth configuration upper limit value of the T-CONT1 is 0.1 Gbps, an assured bandwidth configuration upper limit value of the T-CONT1 is 0.3 Gbps, and a sum of the fixed bandwidth configuration upper limit value of the T-CONT1 and the assured bandwidth configuration upper limit value of the T-CONT1 is 0.4 Gbps. Fixed bandwidth configuration upper limit values and assured bandwidth configuration upper limit values of the T-CONT2 and the T-CONT3 may be learned of from the table. In this way, the OLT may calculate a cumulative sum of the fixed bandwidth configuration upper limit values of all the T-CONTs and a cumulative sum of the assured bandwidth configuration upper limit values of all the T-CONTs, namely, "(0.1+0.2+0.4)+(0.3+0.4+0.6)=2" in Table 1. Because the maximum bandwidth value of the PON port is 1.25 Gbps, and "2>1.25", the OLT needs to determine, based on the bandwidth configuration upper limits of the three T-CONTs and the required bandwidth value of each traffic bearing entity, a bandwidth value actually allocated to the traffic bearing entity.

In an embodiment, the OLT may set a fixed bandwidth value for the T-CONT based on the fixed bandwidth configuration upper limit value of the T-CONT. The fifth row in Table 1 is used as an example. Because the fixed bandwidth configuration upper limit value of the T-CONT1 is 0.1 Gbps, the OLT determines that the fixed bandwidth value of the T-CONT1 is 0.1 Gbps. Similarly, the OLT may determine that the fixed bandwidth value of the T-CONT2 is 0.2 Gbps and the fixed bandwidth value of the T-CONT3 is 0.4 Gbps. Then, the OLT may determine, through calculation, that a first remaining bandwidth value of the PON port is 1.25−(0.1+0.2+0.4)=0.55 Gbps. A first bandwidth allocation ratio is equal to a ratio of the assured bandwidth configuration upper limit value of the T-CONT to the cumulative sum of the assured bandwidth configuration upper limit values of the T-CONTs. Therefore, a first weighted bandwidth value of each T-CONT may be calculated. For ease of understanding, the T-CONT1 is used as an example for description. The first weighted bandwidth value of the T-CONT1 is (1.25−0.7)*0.3/(0.3+0.4+0.6)=0.1269 Gbps. It should be understood that because first bandwidth allocation ratios of different T-CONTs are different, first weighted bandwidth values of the different T-CONTs are different. In addition, the OLT further needs to calculate a first remaining required bandwidth value of each T-CONT. The T-CONT1 is used as an example, and the first remaining required bandwidth value of the T-CONT1 is 0.5−0.1=0.4 Gbps. It should be noted that a time sequence between the step that the OLT determines the first weighted bandwidth value of the T-CONT and the step that the OLT determines the first remaining required bandwidth value of the T-CONT is not limited.

Then, the OLT may calculate a minimum value among the first weighted bandwidth value of the T-CONT, the assured bandwidth configuration upper limit value of the T-CONT, and the first remaining required bandwidth value of the T-CONT, and determine the minimum value as a first assured bandwidth value of the T-CONT. The T-CONT1 is still used as an example. The first weighted bandwidth value of the T-CONT1 is 0.1269 Gbps, the assured bandwidth configuration upper limit value of the T-CONT1 is 0.3 Gbps, and the first remaining required bandwidth value of the T-CONT1 is 0.4 Gbps. Therefore, the OLT may determine that the minimum value among the three values is the first weighted bandwidth value of the T-CONT1, namely, 0.1269 Gbps. In this way, the first assured bandwidth value of the T-CONT1 is 0.1269 Gbps. Similarly, the OLT may calculate the first assured bandwidth value of the T-CONT2 and the first assured bandwidth value of the T-CONT3.

In this case, the OLT further needs to calculate a second remaining bandwidth value of the PON port to determine whether the PON port still has remaining bandwidth, that can be allocated, if the OLT determines an assured bandwidth value of each T-CONT based on the first assured bandwidth value. It may be learned from calculation that 0.55−(0.1269+0.1692+0.2538)=0. Therefore, the OLT may determine that the second remaining bandwidth value of the PON port is zero. In this way, the OLT may determine that the assured bandwidth value of the T-CONT1 is 0.1269 Gbps, the assured bandwidth value of the T-CONT1 is 0.1692 Gbps, and the assured bandwidth value of the T-CONT1 is 0.2538 Gbps.

TABLE 1

|  | T-CONT1 | T-CONT2 | T-CONT3 | Total |
|---|---|---|---|---|
| Required bandwidth value | 0.5 | 0.5 | 1.2 | 2.2 |
| Bandwidth configuration upper limit | (0.1 + 0.3; 0.4) | (0.2 + 0.4; 0.6) | (0.4 + 0.6; 1.0) | |
| Total sum of a cumulative sum of fixed bandwidth configuration upper limit values and a cumulative sum of assured bandwidth configuration upper limit values | (0.1 + 0.2 + 0.4) + (0.3 + 0.4 + 0.6) = 2 > 1.25 | | | |
| Fixed bandwidth value | 0.1 | 0.2 | 0.4 | 0.7 |
| First remaining required bandwidth value | 0.5 − 0.1 = 0.4 | 0.5 − 0.2 = 0.3 | 1.2 − 0.4 = 0.8 | 1.5 |
| First weighted bandwidth value | (1.25 − 0.7) * 0.3/ (0.3 + 0.4 + 0.6) = 0.1269 | (1.25 − 0.7) * 0.4/ (0.3 + 0.4 + 0.6) = 0.1692 | (1.25 − 0.7) * 0.6/ (0.3 + 0.4 + 0.6) = 0.2538 | 0.55 |
| First assured bandwidth value | 0.1269 | 0.1692 | 0.2538 | 0.55 |
| Second remaining bandwidth value of a PON port | 0.55 − (0.1269 + 0.1692 + 0.2538) = 0 | | | |
| Assured bandwidth value (first assured bandwidth value) | 0.1269 | 0.1692 | 0.2538 | 0.55 |

In this case, because a cumulative sum of bandwidth values allocated by the OLT to the T-CONTs is equal to the maximum bandwidth value of the PON port, the OLT does not allocate bandwidth to the T-CONT in the current allocation period. The bandwidth value actually allocated to each T-CONT in the current allocation period is shown in Table 2.

TABLE 2

|  | T-CONT1 | T-CONT2 | T-CONT3 | Total |
|---|---|---|---|---|
| Fixed bandwidth value/Gbps | 0.1 | 0.2 | 0.4 | 0.7 |
| Assured bandwidth value/Gbps | 0.1269 | 0.1692 | 0.2538 | 0.55 |
| Total | 0.2269 | 0.3692 | 0.6538 | 1.25 |

Then, the OLT sends a bandwidth allocation result in Table 2 to the ONT in a form of an authorization message. In this way, after receiving the authorization message, the ONT can determine, based on the authorization message, the bandwidth value actually allocated to each T-CONT. For details, refer to the related descriptions in the foregoing step 203.

In this embodiment, the following case is described: The central office equipment determines that the minimum value among the first weighted bandwidth value of the traffic bearing entity, the assured bandwidth configuration upper limit value of the traffic bearing entity, and the first remaining required bandwidth value of the traffic bearing entity is the first weighted bandwidth value of the traffic bearing entity. In this case, the central office equipment may determine the first assured bandwidth value of the traffic bearing entity based on the first weighted bandwidth value. The first weighted value is related to the first bandwidth allocation ratio. The first bandwidth allocation ratio can fairly reflect the bandwidth actually required by each traffic bearing entity. In this way, the central office equipment can allocate bandwidth to each traffic bearing entity, and can also allocate the bandwidth to the traffic bearing entity based on a specified ratio. Therefore, resource allocation is more appropriate.

In addition, the bandwidth allocation ratio in the foregoing step 303 may include the second bandwidth allocation ratio in addition to the first bandwidth allocation ratio. The following describes a case in which the bandwidth allocation ratio is the first bandwidth allocation ratio and the second bandwidth allocation ratio. For details, refer to FIG. 5A and FIG. 5B.

In this embodiment, the central office equipment determines the assured bandwidth value of each traffic bearing entity based on the first remaining bandwidth value of the PON port of the central office equipment, the first bandwidth allocation ratio, and the second bandwidth allocation ratio. An example process may include the following steps.

501. The central office equipment multiplies the first remaining bandwidth value of the PON port of the central office equipment by the first bandwidth allocation ratio, to obtain a first weighted bandwidth value of the traffic bearing entity.

502. The central office equipment determines, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity.

503. The central office equipment calculates a second remaining bandwidth value of the PON port.

In this embodiment, step 501 to step 503 are similar to the foregoing step 401 to step 403.

504. The central office equipment calculates a second remaining required bandwidth value of each traffic bearing entity.

The second remaining required bandwidth value is a difference between the first remaining required bandwidth value of the traffic bearing entity and the first assured bandwidth value of the traffic bearing entity. The second remaining required bandwidth value may be used to indicate a bandwidth value required by the traffic bearing entity in addition to the fixed bandwidth value and the first assured bandwidth value. For ease of subsequent description, in this embodiment and subsequent embodiments, a traffic bearing entity whose second remaining required bandwidth value is greater than zero is referred to as a target traffic bearing entity. In addition, the target traffic bearing entity is only one name, and constitutes no limitation on the traffic bearing entity.

It should be noted that a time sequence between step 503 and step 504 is not limited.

In this embodiment, when the second remaining bandwidth value of the PON port is greater than zero and there are target traffic bearing entities, the central office equipment performs step 505.

505. The central office equipment multiplies the second remaining bandwidth value of the PON port by the second bandwidth allocation ratio, to obtain a second weighted bandwidth value of each traffic bearing entity.

In this embodiment, when the second remaining bandwidth value of the PON port is greater than zero and there are target traffic bearing entities, it indicates that the PON port of the central office equipment still has bandwidth that can be allocated. In addition, there are also traffic bearing entities whose bandwidth requirements are not met in the traffic bearing entities in the customer premises equipment. Therefore, the central office equipment may further allocate bandwidth to each target traffic bearing entity. The central office equipment multiplies the second remaining bandwidth value of the PON port by the second bandwidth allocation ratio, to obtain the second weighted bandwidth value of the traffic bearing entity. For the second remaining bandwidth value of the PON port, refer to the related descriptions in the foregoing step 403. The second bandwidth allocation ratio is equal to a ratio of the assured bandwidth configuration upper limit value of the target traffic bearing entity to a cumulative sum of the assured bandwidth configuration upper limit values of the target traffic bearing entities. For the target traffic bearing entity, refer to the related descriptions in the foregoing step 504.

It should be understood that the second weighted bandwidth value is similar to the first weighted bandwidth value. Because second bandwidth allocation ratios of different traffic bearing entities are different, calculated second weighted values of the different traffic bearing entities are also different.

506. The central office equipment determines, as a second assured bandwidth value of the traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity.

For the second weighted bandwidth value of the target traffic bearing entity, refer to the related descriptions in the foregoing step 505. For the second remaining required bandwidth value of the target traffic bearing entity, refer to the related descriptions in the foregoing step 504. Step 506 is similar to the foregoing step 402. The central office equipment determines, as the second assured bandwidth value of the traffic bearing entity, the minimum value among the second weighted bandwidth value of the target traffic bearing entity, the assured bandwidth configuration upper limit value of the target traffic bearing entity, and the second remaining required bandwidth value of the traffic bearing entity. This can avoid a case in which bandwidth that may be allocated to another traffic bearing entity is decreased because a traffic bearing entity abnormally applies for very high bandwidth. In addition, when bandwidth is further allocated to each target traffic bearing entity in this manner, it may be further ensured that bandwidth of the PON port is fully used, and fairness of bandwidth allocation by the central office equipment can also be ensured when first assured bandwidth and second assured bandwidth are allocated to each target traffic bearing entity.

It should be noted that the second assured bandwidth value is not necessarily the assured bandwidth value actually allocated to the traffic bearing entity. The central office equipment further needs to determine whether the second remaining bandwidth value of the PON port of the central office equipment can be fully allocated and a bandwidth requirement of each traffic bearing entity can be met when it is assumed that the third remaining bandwidth value of the PON port of the central office equipment is allocated based on the second assured bandwidth value. Therefore, the central office equipment performs step 507.

507. The central office equipment calculates the third remaining bandwidth value of the PON port.

The third remaining bandwidth value of the PON port is equal to a difference between the second remaining bandwidth value of the PON port and a cumulative sum of the second assured bandwidth values of the traffic bearing entities.

In this embodiment, when the third remaining bandwidth value of the PON port is equal to zero, the central office equipment performs step 508. When the third remaining bandwidth value of the PON port is greater than zero, the central office equipment performs step 509.

508. The central office equipment determines that the assured bandwidth value of the traffic bearing entity is equal to a sum of the first assured bandwidth value and the second assured bandwidth value.

In this embodiment, when the third remaining bandwidth value of the PON port is equal to zero, it indicates that the PON port of the central office equipment has no remaining bandwidth. In this case, the central office equipment may determine that the assured bandwidth value of the traffic bearing entity is equal to the sum of the first assured bandwidth value and the second assured bandwidth value.

509. The central office equipment performs another operation.

In this embodiment, when the third remaining bandwidth value of the PON port is greater than zero, the central office equipment may allocate a third assured bandwidth value to each traffic bearing entity again in a manner similar to that in the foregoing step 504 to step 508. In other words, the central office equipment may cyclically allocate bandwidth to each traffic bearing entity for a plurality of times. However, a specific quantity of times of cyclic allocation may be correspondingly adjusted based on different application scenarios. This is not specifically limited herein.

To facilitate further understanding, the following describes in detail the foregoing bandwidth allocation method by using exemplary values.

In this embodiment, an example in which the central office equipment is an OLT, the OLT has only one PON port, and a maximum bandwidth value of the PON port is 1.25 Gbps is used for description. In addition, an example in which the customer premises equipment is an ONT and the ONT has only three traffic bearing entities T-CONTs is used for description. In addition, an assumption that the OLT is connected to only one ONT further needs to be made. Similar to the foregoing descriptions, required bandwidth values and bandwidth configuration upper limits of the three T-CONTs in the ONT are shown in Table 3. In addition, steps that the OLT determines a fixed bandwidth value, a first remaining required bandwidth value, and a first weighted bandwidth value of each T-CONT are similar to the steps in the embodiment corresponding to the foregoing Table 1.

As shown in Table 3, when the OLT calculates a first assured bandwidth value of each T-CONT, the OLT may calculate a minimum value among the first weighted bandwidth value of the T-CONT, an assured bandwidth configuration upper limit value of the T-CONT, and the first remaining required bandwidth value of the T-CONT, and determine the minimum value as the first assured bandwidth value of the T-CONT. In this case, a T-CONT3 is used as an example. The first weighted bandwidth value of the T-CONT3 is 0.2538 Gbps, the assured bandwidth configuration upper limit value of the T-CONT3 is 0.6 Gbps, and the first remaining required bandwidth value of the T-CONT3 is 0.1 Gbps. Therefore, the OLT may determine that the minimum value among the three values is the first required bandwidth value of the T-CONT3, namely, 0.1 Gbps. In this way, the first assured bandwidth value of the T-CONT3 is 0.1 Gbps. Similarly, the OLT may calculate the first assured bandwidth value of a T-CONT1 and the first assured bandwidth value of a T-CONT2.

In this case, the OLT further needs to calculate a second remaining bandwidth value of the PON port. It may be learned from calculation that 0.55−(0.1269+0.1692+0.1)=0.1539. Therefore, the OLT may determine that the second remaining bandwidth value of the PON port is greater than zero. In this way, the OLT may determine that the PON port of the OLT still has remaining bandwidth, and the OLT further needs to allocate bandwidth to each T-CONT. In this case, a sum of the first assured bandwidth value of the T-CONT3 and the fixed bandwidth value of the T-CONT3 is 0.1+0.4=0.5 that is exactly equal to the required bandwidth value of the T-CONT3. Therefore, the OLT may determine that bandwidth allocated by the OLT to the T-CONT3 can meet a bandwidth requirement of the T-CONT3. In this case, the T-CONT3 does not participate in subsequent allocation of a second assured bandwidth value, and an assured bandwidth value of the T-CONT3 is the first assured bandwidth value. Therefore, the OLT allocates bandwidth to the T-CONT1 and the T-CONT2 by using a second bandwidth allocation ratio.

The OLT separately calculates a second weighted bandwidth value of the T-CONT1 and a second weighted bandwidth value of the T-CONT2. The T-CONT1 is used as an example. The second weighted bandwidth value of the T-CONT1 is equal to a value obtained by multiplying the second remaining bandwidth value of the PON port by a second bandwidth allocation ratio of the T-CONT1, that is, 0.1539*0.3/(0.3+0.4)=0.0660. Similarly, the second weighted bandwidth value of the T-CONT2 is 0.0879. Then, the OLT determines, as a second assured bandwidth value of the T-CONT1, a minimum value among the second weighted bandwidth value of the T-CONT1, the assured bandwidth configuration upper limit value of the T-CONT1, and a second remaining required bandwidth value of the T-CONT1. Therefore, the OLT may determine that the second assured bandwidth value of the T-CONT1 is 0.0660. Similarly, the OLT may determine that a second assured bandwidth value of the T-CONT2 is 0.0879. In this case, the OLT calculates a third remaining bandwidth value of the PON port. The third remaining bandwidth value of the PON port is equal to a difference between the second remaining bandwidth value of the PON port and a sum of the second assured bandwidth value of the T-CONT1 and the second assured bandwidth value of the T-CONT2, that is, 0.1539−(0.0660+0.0879)=0. In this case, because the third remaining bandwidth value of the PON port is equal to zero, it indicates that the PON port of the central office equipment has no remaining bandwidth. The OLT determines that an assured bandwidth value of the T-CONT1 is equal to a sum of the first assured bandwidth value and the second assured bandwidth value. In other words, the assured bandwidth value of the T-CONT1 is 0.1269+0.0660=0.1929. Similarly, an assured bandwidth value of the T-CONT2 is 0.1692+0.0879=0.2571.

TABLE 3

|  | T-CONT1 | T-CONT2 | T-CONT3 | Total |
| --- | --- | --- | --- | --- |
| Required bandwidth value | 0.5 | 0.5 | 0.5 | 1.5 |
| Bandwidth configuration upper limit | (0.1 + 0.3; 0.4) | (0.2 + 0.4; 0.6) | (0.4 + 0.6; 1.0) |  |
| Total sum of a cumulative sum of fixed bandwidth configuration upper limit values and a cumulative sum of assured bandwidth configuration upper limit values | (0.1 + 0.3) + (0.2 + 0.4) + (0.4 + 0.6) = 2 > 1.25 | | | |

TABLE 3-continued

|  | T-CONT1 | T-CONT2 | T-CONT3 | Total |
|---|---|---|---|---|
| Fixed bandwidth value | 0.1 | 0.2 | 0.4 | 0.7 |
| First remaining required bandwidth value | 0.5 − 0.1 = 0.4 | 0.5 − 0.2 = 0.3 | 0.5 − 0.4 = 0.1 | 0.8 |
| First weighted bandwidth value | 0.1269 | 0.1692 | 0.2538 | 0.55 |
| First assured bandwidth value | 0.1269 | 0.1692 | 0.1 | 0.3961 |
| Second remaining bandwidth value of a PON port | 0.55 − (0.1269 + 0.1692 + 0.1) = 0.1539 | | | |
| Second remaining required bandwidth value | 0.4 − 0.1269 = 0.2731 | 0.3 − 0.1692 = 0.1308 | 0.1 − 0.1 = 0 | 0.4039 |
| Second weighted bandwidth value | 0.1539 * 0.3/(0.3 + 0.4) = 0.0660 | 0.1539 * 0.4/(0.3 + 0.4) = 0.0879 | — | 0.1539 |
| Second assured bandwidth value | 0.0660 | 0.0879 | — | 0.1539 |
| Third remaining bandwidth value of a PON port | 0.1539 − (0.0660 + 0.0879) = 0 | | | |
| Assured bandwidth value (first assured bandwidth value + second assured bandwidth value) | 0.1269 + 0.0660 = 0.1929 | 0.1692 + 0.0879 = 0.2571 | 0.1 | 0.55 |

In this case, because a cumulative sum of bandwidth values allocated by the OLT to the T-CONTs is equal to the maximum bandwidth value of the PON port, the OLT does not allocate bandwidth to the T-CONT in a current allocation period. Specifically, a bandwidth value actually allocated to each T-CONT in the current allocation period is shown in Table 4.

TABLE 4

|  | T-CONT1 | T-CONT2 | T-CONT3 | Total |
|---|---|---|---|---|
| Fixed bandwidth value/Gbps | 0.1 | 0.2 | 0.4 | 0.7 |
| First assured bandwidth value/Gbps | 0.1269 | 0.1692 | 0.1 | 0.3961 |
| Second assured bandwidth value/Gbps | 0.0660 | 0.0879 | — | 0.1539 |
| Assured bandwidth value/Gbps | 0.1269 + 0.0660 = 0.1929 | 0.1692 + 0.0879 = 0.2571 | 0.1 | 0.55 |
| Total | 0.2929 | 0.4571 | 0.5 | 1.25 |

However, in actual application, there may also be a case in which the third remaining bandwidth value of the PON port is greater than zero. In this case, the OLT may allocate a third assured bandwidth value to each T-CONT again in a manner similar to that in the foregoing step 504 to step 508. In other words, the OLT may cyclically allocate bandwidth to each T-CONT for a plurality of times. However, a specific quantity of times of cyclic allocation may be correspondingly adjusted based on different application scenarios. This is not specifically limited herein.

Figure 4:
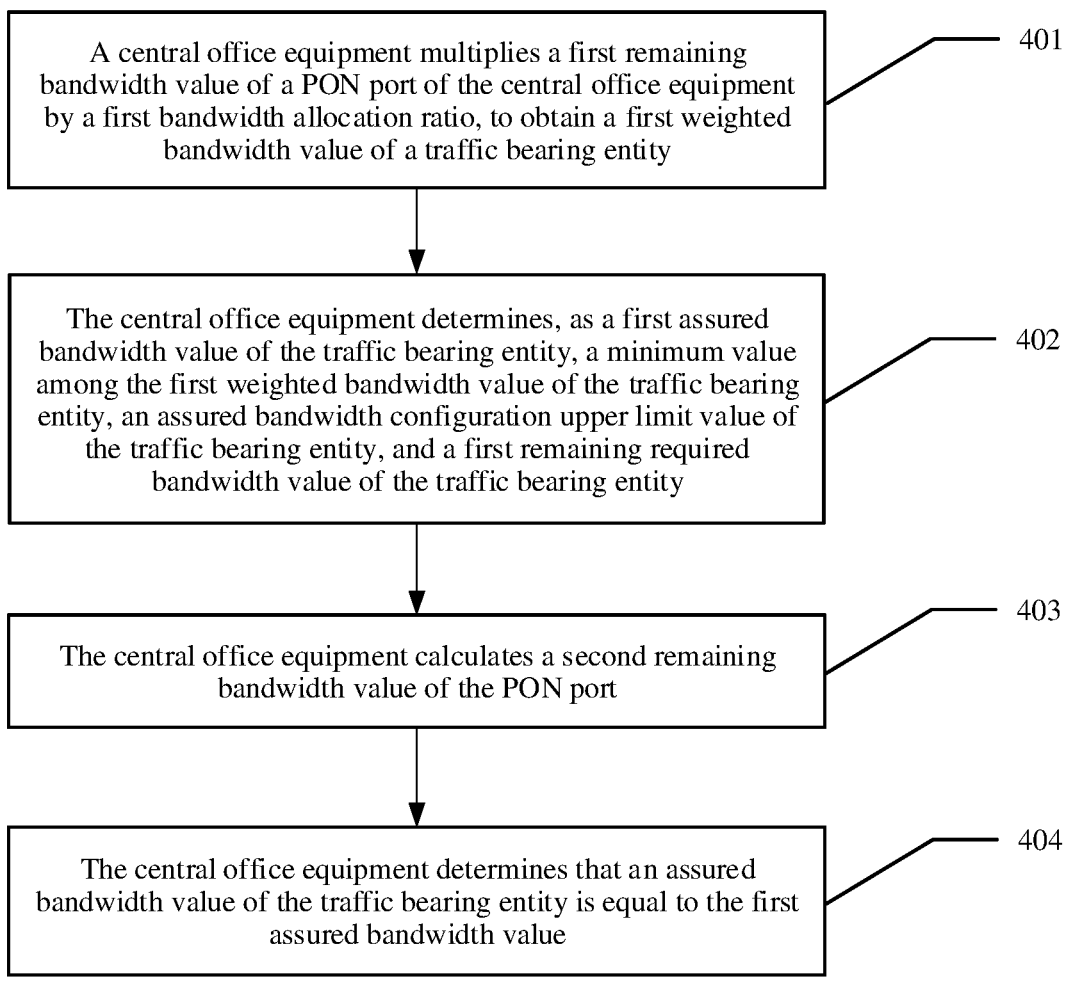
FIG. 4 is another flowchart of a bandwidth allocation method according to an embodiment of this application.
Figure 5A:
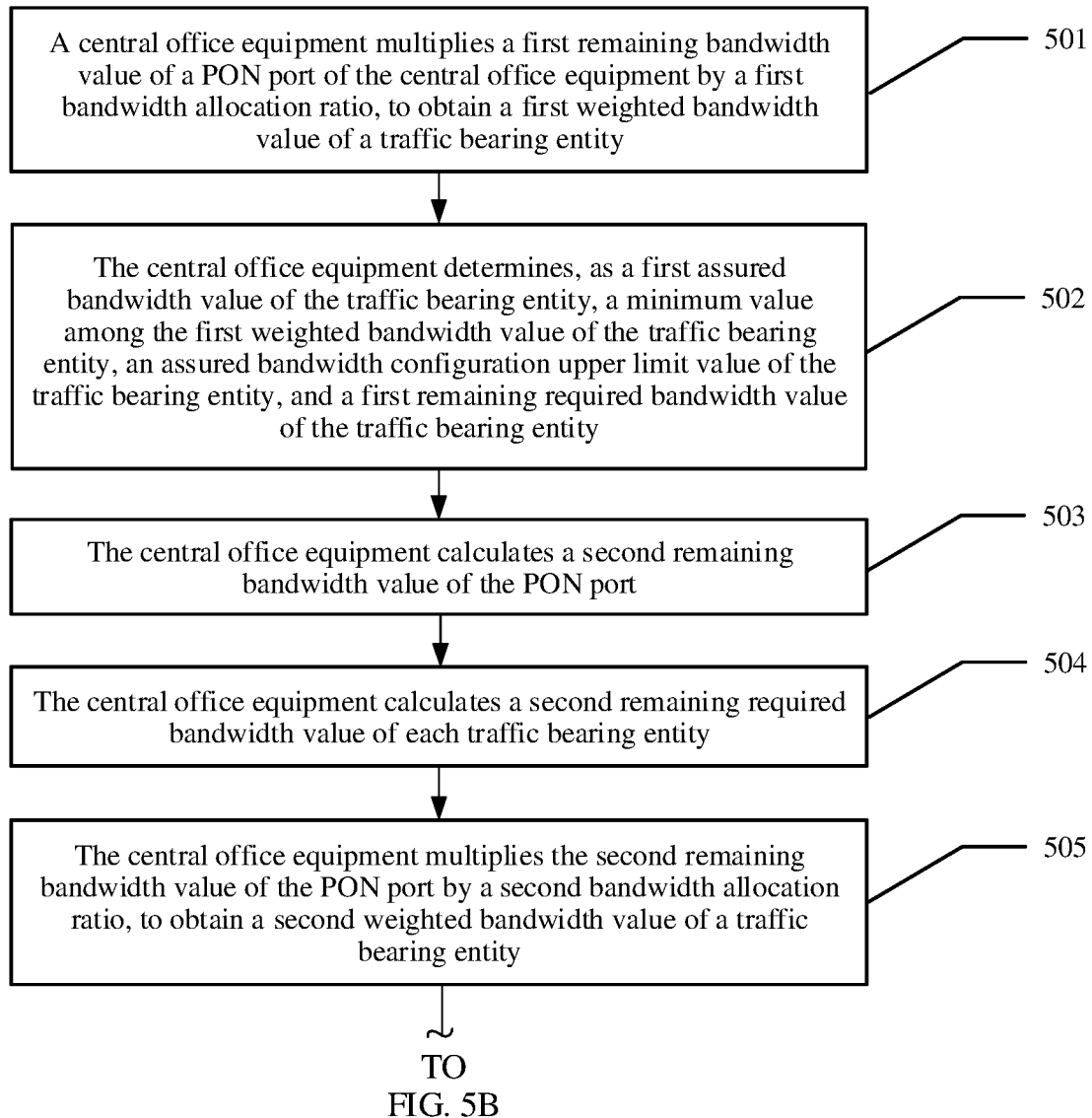
FIG. 5A and FIG. 5B are another flowchart of a bandwidth allocation method according to an embodiment of this application.
Figure 5B:
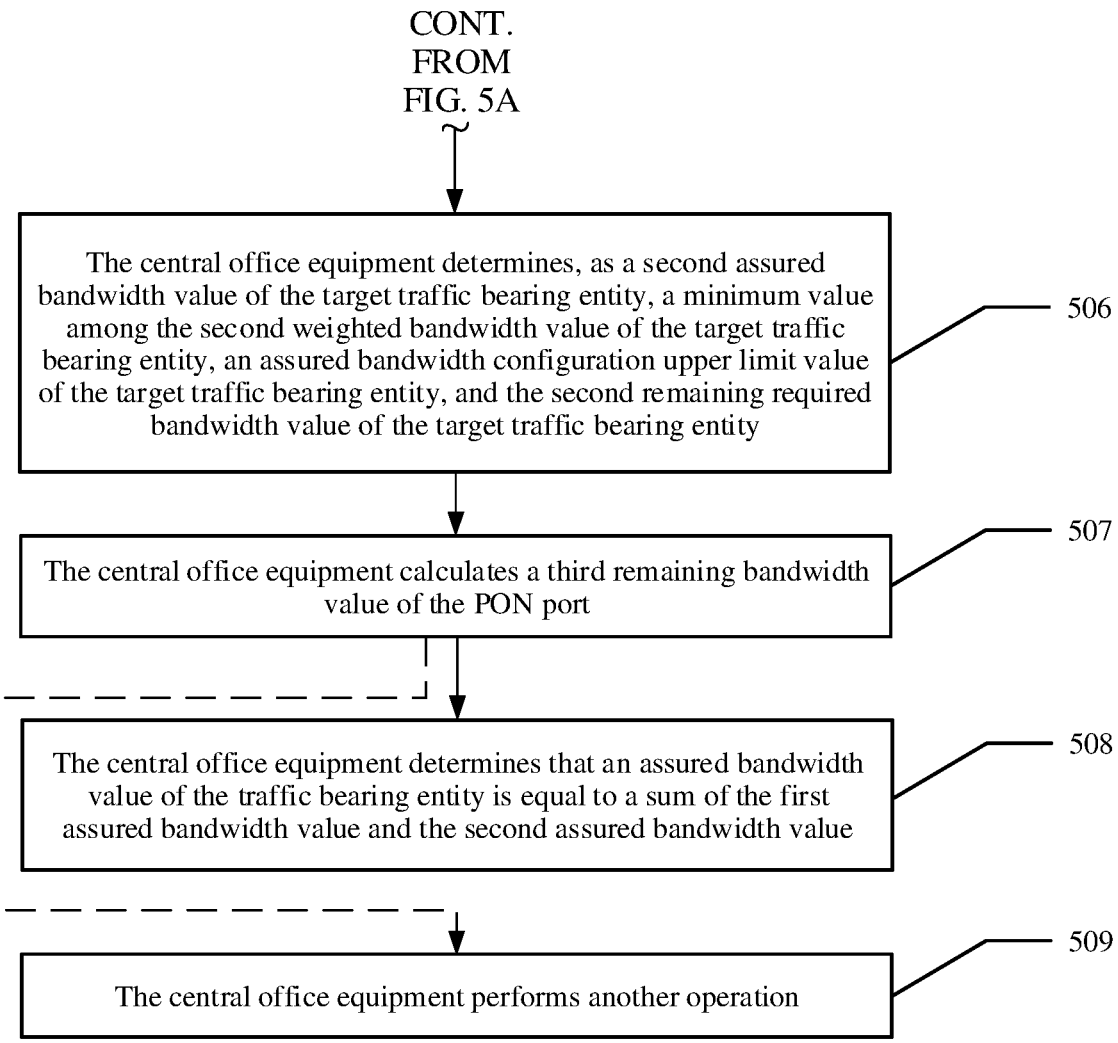

In this embodiment, on the basis of the foregoing embodiment corresponding to FIG. 4, the minimum value among the first weighted bandwidth value of the traffic bearing entity, the assured bandwidth configuration upper limit value of the traffic bearing entity, and the first remaining required bandwidth value of the traffic bearing entity is not the first weighted bandwidth value of the traffic bearing entity. Therefore, sufficient bandwidth has been already allocated to some traffic bearing entities. In this way, the traffic bearing entities to which sufficient bandwidth has been allocated do not participate in allocation of the second assured bandwidth. Then, the central office equipment allocates bandwidth to the target traffic bearing entity by using the second bandwidth allocation ratio, to further determine the second assured bandwidth value. In this process, the central office equipment uses the first bandwidth allocation ratio and the second bandwidth allocation ratio. In addition, the first bandwidth allocation ratio and the second bandwidth allocation ratio can fairly reflect the bandwidth actually required by each traffic bearing entity. In this way, the central office equipment can allocate bandwidth to each traffic bearing entity, and can also allocate the bandwidth to the traffic bearing entity based on a specified ratio. Therefore, resource allocation is more appropriate.

Figure 6:
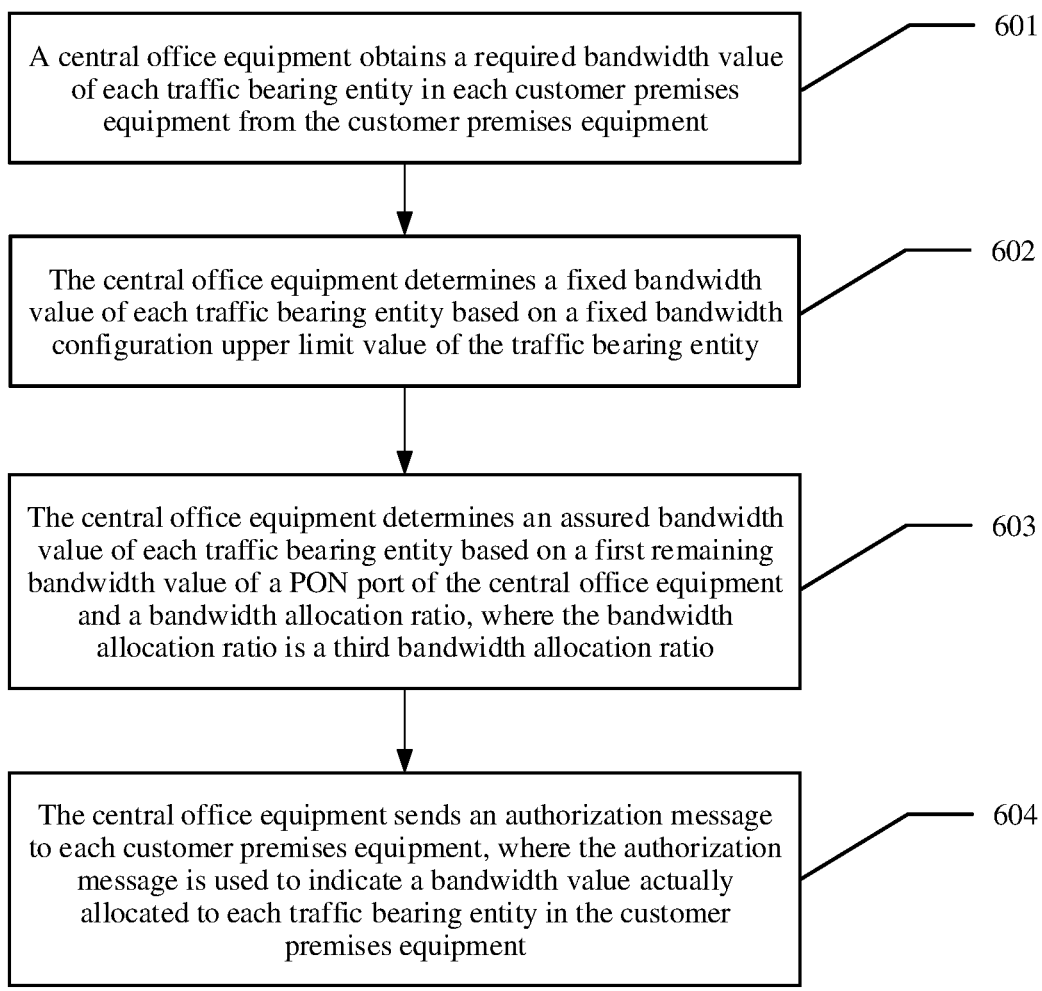
FIG. 6 is another flowchart of a bandwidth allocation method according to an embodiment of this application.

The foregoing describes a case in which the central office equipment allocates bandwidth based on the first bandwidth allocation ratio. The following describes a relatively simple bandwidth allocation manner. In this case, the central office equipment may determine, by using only a third allocation ratio, bandwidth actually allocated to each traffic bearing entity. As shown in FIG. 6, steps performed by the central office equipment in the bandwidth allocation method include the following:

601. The central office equipment obtains a required bandwidth value of each traffic bearing entity in each customer premises equipment from the customer premises equipment.

In this embodiment, the central office equipment may obtain the required bandwidth value of each traffic bearing entity by receiving a bandwidth allocation request or monitoring actual traffic information. This step is similar to the foregoing step 201.

602. The central office equipment determines a fixed bandwidth value of each traffic bearing entity based on a fixed bandwidth configuration upper limit value of the traffic bearing entity.

In this embodiment, when a total sum of a cumulative sum of the fixed bandwidth configuration upper limit values of the traffic bearing entities and a cumulative sum of assured bandwidth configuration upper limit values of the traffic bearing entities is greater than a maximum bandwidth value of a passive optical network (PON) port of the central office equipment, the central office equipment may determine the fixed bandwidth value of each traffic bearing entity based on the fixed bandwidth configuration upper limit value of the traffic bearing entity. This step is similar to the foregoing step 302.

603. The central office equipment determines an assured bandwidth value of each traffic bearing entity based on a first remaining bandwidth value of the PON port of the central office equipment and a bandwidth allocation ratio, where the bandwidth allocation ratio is the third bandwidth allocation ratio.

In this embodiment, the first remaining bandwidth value of the PON port of the central office equipment is a difference between the maximum bandwidth value of the PON port of the central office equipment and a cumulative sum of the fixed bandwidth values of the traffic bearing entities. The maximum bandwidth value of the PON port has been described in detail in the foregoing step 202.

The central office equipment multiplies the first remaining bandwidth value of the PON port of the central office equipment by the third bandwidth allocation ratio, to obtain the assured bandwidth value of the traffic bearing entity. The third bandwidth allocation ratio is equal to a ratio of a ratio factor of the traffic bearing entity to a cumulative sum of ratio factors of the traffic bearing entities. The ratio factor of the traffic bearing entity is a smaller value in a first remaining required bandwidth value of the traffic bearing entity and the assured bandwidth configuration upper limit value of the traffic bearing entity. The first remaining required bandwidth value of the traffic bearing entity is a difference between the required bandwidth value of the traffic bearing entity and the fixed bandwidth value of the traffic bearing entity.

To facilitate further understanding, the following describes in detail the foregoing bandwidth allocation method by using exemplary values.

In this embodiment, an example in which the central office equipment is an OLT, the OLT has only one PON port, and a maximum bandwidth value of the PON port is 1.25 Gbps is used for description. In addition, an example in which the customer premises equipment is an ONT and the ONT has only three traffic bearing entities T-CONTs is used for description. In addition, an assumption that the OLT is connected to only one ONT further needs to be made. Similar to the foregoing descriptions, required bandwidth values and bandwidth configuration upper limits of the three T-CONTs in the ONT are shown in Table 5. In addition, steps that the OLT determines a fixed bandwidth value of each T-CONT and a first remaining required bandwidth value of the T-CONT are similar to the steps in the embodiment corresponding to the foregoing Table 1.

In this embodiment, the OLT determines a ratio factor after the OLT determines the fixed bandwidth value of each T-CONT and the first remaining required bandwidth value of the T-CONT. The ratio factor is used to determine a third bandwidth allocation ratio of each T-CONT. In an embodiment, the ratio factor is a smaller value in the first remaining required bandwidth value of each T-CONT and an assured bandwidth configuration upper limit value of the T-CONT. For ease of understanding, a T-CONT1 is used as an example for description. The ratio factor of the T-CONT1 is a smaller value in the first remaining required bandwidth value of the T-CONT1 and the assured bandwidth configuration upper limit value of the T-CONT1. The first remaining required bandwidth value of the T-CONT1 is 0.4 Gbps, and the assured bandwidth configuration upper limit value of the T-CONT1 is 0.3 Gbps. Therefore, it may be learned that the ratio factor of the T-CONT1 is 0.3. Similarly, the OLT may determine, through calculation, that the ratio factor of a T-CONT2 is 0.3 and the ratio factor of a T-CONT3 is 0.1. Therefore, the OLT may further determine, through calculation, that the third bandwidth allocation ratio of the T-CONT1 is 0.3/(0.3+0.3+0.1)=0.4286. Similarly, the OLT may determine, through calculation, that the third bandwidth allocation ratio of the T-CONT2 is 0.3/(0.3+0.3+0.1)=0.4286 and the third bandwidth allocation ratio of the T-CONT3 is 0.1/(0.3+0.3+0.1)=0.1428. An assured bandwidth value of each T-CONT is equal to a value obtained by multiplying a first remaining bandwidth value of the PON port of the OLT by the third bandwidth allocation ratio of the T-CONT. The T-CONT1 is still used as an example. Therefore, the assured bandwidth value of the T-CONT1 is 0.55*0.3/(0.3+0.3+0.1)=0.2357 Gbps. Similarly, the OLT may determine, through calculation, that the assured bandwidth value of the T-CONT2 is 0.55*0.3/(0.3+0.3+0.1)=0.2357 Gbps and the assured bandwidth value of the T-CONT3 is 0.55*0.1/(0.3+0.3+0.1)=0.0786 Gbps. For details, refer to a related calculation process in Table 5.

TABLE 5

|  | T-CONT1 | T-CONT2 | T-CONT3 | Total |
|---|---|---|---|---|
| Required bandwidth value | 0.5 | 0.5 | 0.5 | 1.5 |
| Bandwidth configuration upper limit | (0.1 + 0.3; 0.4) | (0.2 + 0.4; 0.6) | (0.4 + 0.6; 1.0) |  |

TABLE 5-continued

|  | T-CONT1 | T-CONT2 | T-CONT3 | Total |
| --- | --- | --- | --- | --- |
| Total sum of a cumulative sum of fixed bandwidth configuration upper limit values and a cumulative sum of assured bandwidth configuration upper limit values | (0.1 + 0.3) + (0.2 + 0.4) + (0.4 + 0.6) = 2 > 1.25 | | | |
| Fixed bandwidth | 0.1 | 0.2 | 0.4 | 0.7 |
| First remaining required bandwidth value | 0.5 − 0.1 = 0.4 | 0.5 − 0.2 = 0.3 | 0.5 − 0.4 = 0.1 | 0.8 |
| Ratio factor | 0.3 | 0.3 | 0.1 | |
| First remaining bandwidth value of a PON port | | 1.25 − 0.7 = 0.55 | | |
| Assured bandwidth value | 0.55 * 0.3/(0.3 + 0.3 + 0.1) = 0.2357 | 0.55 * 0.3/(0.3 + 0.3 + 0.1) = 0.2357 | 0.55 * 0.1/(0.3 + 0.3 + 0.1) = 0.0786 | 0.55 |

In this embodiment, the OLT may obtain, by using the foregoing bandwidth allocation method, a bandwidth allocation result shown in Table 6.

TABLE 6

|  | T-CONT1 | T-CONT2 | T-CONT3 | Total |
| --- | --- | --- | --- | --- |
| Fixed bandwidth | 0.1 | 0.2 | 0.4 | 0.7 |
| Assured bandwidth value | 0.2357 | 0.2357 | 0.0786 | 0.55 |
| Total | 0.3357 | 0.4357 | 0.4786 | 1.25 |

604. The central office equipment sends an authorization message to each customer premises equipment, where the authorization message is used to indicate a bandwidth value actually allocated to each traffic bearing entity in the customer premises equipment.

In this embodiment, step 604 is similar to the foregoing step 203.

This embodiment provides a simpler bandwidth allocation manner than the foregoing embodiment corresponding to FIG. 3. In the bandwidth allocation manner in this embodiment, the central office equipment may determine the assured bandwidth value of each traffic bearing entity one time based on the third bandwidth allocation ratio. Therefore, the bandwidth allocation process can be fast and efficient. In addition, the ratio factor used to determine the third bandwidth allocation ratio is determined by comprehensively considering the first remaining required bandwidth value of the traffic bearing entity and the assured bandwidth configuration upper limit value of the traffic bearing entity. Therefore, bandwidth actually required by each traffic bearing entity can be accurately reflected. In this way, it may be inferred that assured bandwidth determined by the central office equipment based on the third bandwidth allocation ratio determined based on the ratio factor can enable the bandwidth allocation process to be fairer.

Figure 7:
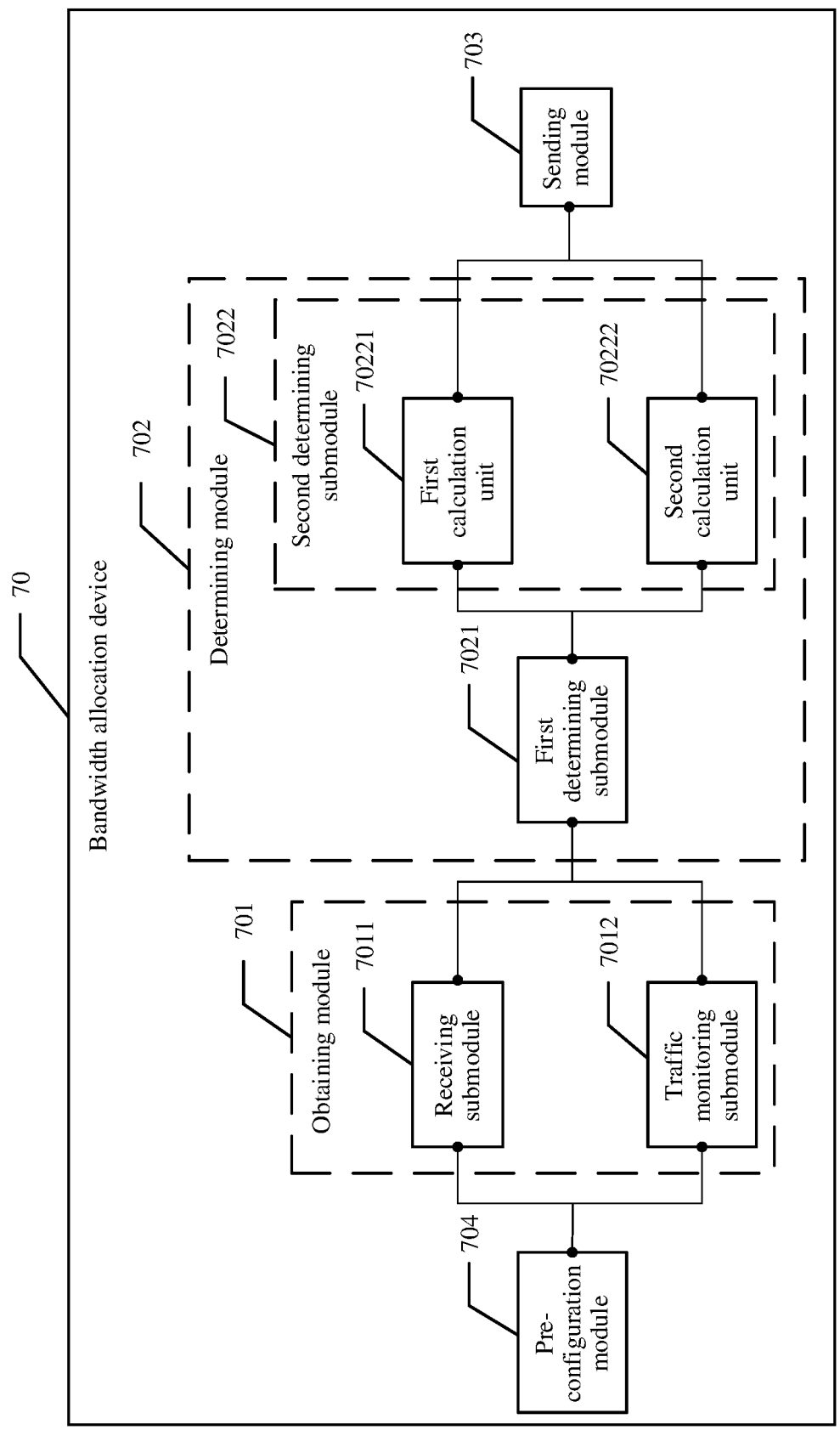
FIG. 7 is a schematic diagram of an embodiment of a bandwidth allocation device according to an embodiment of this application.

The foregoing describes an example implementation process of the bandwidth allocation method. The following describes an exemplary bandwidth allocation device in the bandwidth allocation method. FIG. 7 is a schematic structural diagram of a bandwidth allocation device 70 according to an embodiment. The bandwidth allocation device 70 may vary greatly with configuration or performance. The bandwidth allocation device 70 includes:

an obtaining module 701, configured to obtain a required bandwidth value of each traffic bearing entity in each customer premises equipment from the customer premises equipment; a determining module 702, configured to: when a total sum of a cumulative sum of fixed bandwidth configuration upper limit values of the traffic bearing entities and a cumulative sum of assured bandwidth configuration upper limit values of the traffic bearing entities is greater than a maximum bandwidth value of a passive optical network (PON) port of the central office equipment, determine, based on a bandwidth configuration upper limit of each traffic bearing entity and the required bandwidth value of the traffic bearing entity, a bandwidth value actually allocated to the traffic bearing entity, where the bandwidth configuration upper limit includes the fixed bandwidth configuration upper limit value and the assured bandwidth configuration upper limit value; and a sending module 703, configured to send an authorization message to each customer premises equipment, where the authorization message is used to indicate the bandwidth value actually allocated to each traffic bearing entity in the customer premises equipment.

In this embodiment, the bandwidth allocation device allows the total sum, of the cumulative sum of the fixed bandwidth configuration upper limit values of the traffic bearing entities and the cumulative sum of the assured bandwidth configuration upper limit values of the traffic bearing entities, to be greater than the maximum bandwidth value of the PON port of the bandwidth allocation device. In this case, the bandwidth allocation device may determine, based on the fixed bandwidth configuration upper limit value of each traffic bearing entity, the assured bandwidth configuration upper limit value of the traffic bearing entity, and the required bandwidth value of the traffic bearing entity, the bandwidth value actually allocated to the traffic bearing entity. The bandwidth allocation device considers more factors during bandwidth allocation, and may allocate a part of bandwidth to each traffic bearing entity. This avoids a case in which no bandwidth is allocated to some traffic bearing entities. Therefore, resource allocation is more appropriate.

In some example implementations, the determining module 702 includes:

a first determining submodule 7021, configured to determine a fixed bandwidth value of each traffic bearing entity based on the fixed bandwidth configuration upper limit value of the traffic bearing entity; and a second determining submodule 7022, configured to determine an assured bandwidth value of each traffic bearing entity based on a first remaining bandwidth value of the PON port of the central office equipment and a bandwidth allocation ratio, where the first remaining bandwidth value of the PON port of the central office equipment is a difference between the maximum bandwidth value of the PON port of the central office equipment and a cumulative sum of the fixed bandwidth values of the traffic bearing entities. In an example implementation, the bandwidth allocation device determines, based on the bandwidth configuration upper limit of each traffic bearing entity and the required bandwidth value of the traffic bearing entity, the bandwidth value actually allocated to the traffic bearing entity. For example, the bandwidth allocation device may first determine the fixed bandwidth value, and then determine the assured bandwidth value. When determining the fixed bandwidth value, the bandwidth allocation device refers to the fixed bandwidth configuration upper limit value. In addition, when determining the assured bandwidth value, the bandwidth allocation device refers to the first remaining bandwidth value of the PON port and the bandwidth allocation ratio. The bandwidth allocation ratio is related to the assured bandwidth configuration upper limit value and the required bandwidth value. Therefore, the bandwidth allocation ratio in this implementation may reflect the bandwidth configuration upper limit of each traffic bearing entity and bandwidth actually required by the traffic bearing entity. In this way, when the bandwidth allocation device may allocate a part of bandwidth to each traffic bearing entity in the bandwidth allocation manner in this implementation, the traffic bearing entity can fairly obtain an actually allocated bandwidth value. Therefore, bandwidth allocation by the bandwidth allocation device is more appropriate.

In some implementations, the second determining submodule 7022 includes:

a first calculation unit 70221, configured to:

multiply the first remaining bandwidth value of the PON port of the central office equipment by a first bandwidth allocation ratio, to obtain a first weighted bandwidth value of the traffic bearing entity; determine, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity, where the first remaining required bandwidth value of the traffic bearing entity is a difference between the required bandwidth value of the traffic bearing entity and the fixed bandwidth value of the traffic bearing entity; calculate a second remaining bandwidth value of the PON port, where the second remaining bandwidth value of the PON port is equal to a difference between the first remaining bandwidth value of the PON port and a cumulative sum of the first assured bandwidth values of the traffic bearing entities; and when the second remaining bandwidth value of the PON port is equal to zero, determine that the assured bandwidth value of the traffic bearing entity is equal to the first assured bandwidth value. The first bandwidth allocation ratio is equal to a ratio of the assured bandwidth configuration upper limit value of the traffic bearing entity to the cumulative sum of the assured bandwidth configuration upper limit values of the traffic bearing entities. In this embodiment, the bandwidth allocation device determines the assured bandwidth value of each traffic bearing entity based on the first remaining bandwidth value of the PON port and the bandwidth allocation ratio. In an embodiment, the bandwidth allocation device may separately calculate the first weighted bandwidth value of the traffic bearing entity, the assured bandwidth configuration upper limit value of the traffic bearing entity, and the first remaining required bandwidth value of the traffic bearing entity, and determine the minimum value among the three values as the first assured bandwidth value of the traffic bearing entity. In this case, if the second remaining bandwidth value of the PON port is equal to zero, the bandwidth allocation device determines that the assured bandwidth value of the traffic bearing entity is equal to the first assured bandwidth value. When the bandwidth allocation device determines the first weighted bandwidth value, the bandwidth allocation device refers to the first remaining required bandwidth value of the traffic bearing entity and the first bandwidth allocation ratio of the traffic bearing entity. Therefore, the assured bandwidth value is determined by the bandwidth allocation device by comprehensively considering an actual requirement of the traffic bearing entity and the bandwidth configuration upper limit of the traffic bearing entity. In this way, bandwidth can be allocated to each traffic bearing entity more fairly and appropriately.

In some implementations, the first calculation unit 70221 is further configured to:

when the second remaining bandwidth value of the PON port is greater than zero and there are target traffic bearing entities, multiply the second remaining bandwidth value of the PON port by a second bandwidth allocation ratio, to obtain a second weighted bandwidth value of the target traffic bearing entity, where the target traffic bearing entity is a traffic bearing entity whose second remaining required bandwidth value is greater than zero, and the second remaining required bandwidth value is a difference between the first remaining required bandwidth value of the traffic bearing entity and the first assured bandwidth value of the traffic bearing entity; determine, as a second assured bandwidth value of the target traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity; calculate a third remaining bandwidth value of the PON port, where the third remaining bandwidth value of the PON port is equal to a difference between the second remaining bandwidth value of the PON port and a cumulative sum of the second assured bandwidth values of the target traffic bearing entities; and when the third remaining bandwidth value of the PON port is equal to zero, determine that the assured bandwidth value of the target traffic bearing entity is equal to a sum of the first assured bandwidth value and the second assured bandwidth value. The second bandwidth allocation ratio is equal to a ratio of the assured bandwidth configuration upper limit value of the target traffic bearing entity to a cumulative sum of the assured bandwidth configuration upper limit values of the target traffic bearing entities. On the basis of the foregoing implementation, this implementation further proposes a case in which the second remaining bandwidth value of the PON port is greater than zero and there are target traffic bearing entities. In this case, the bandwidth allocation device may allocate the second assured bandwidth value to each traffic bearing entity with reference to the foregoing implementation until bandwidth of the PON port is fully allocated or until a bandwidth requirement of the traffic bearing entity is met. In this manner, the bandwidth allocation device may allocate the first assured bandwidth value, the second assured bandwidth value, and the like to each target traffic bearing entity in a manner of allocating small values for a plurality of times. Therefore, bandwidth can be allocated to each target traffic bearing entity more accurately and appropriately in the bandwidth allocation process.

In some other implementations, the second determining submodule 7022 further includes:

a second calculation unit 70222, configured to multiply the first remaining bandwidth value of the PON port of the central office equipment by a third bandwidth allocation ratio, to obtain the assured bandwidth value of the traffic bearing entity. The third bandwidth allocation ratio is equal to a ratio of a ratio factor of the traffic bearing entity to a cumulative sum of ratio factors of the traffic bearing entities. The ratio factor of the traffic bearing entity is a smaller value in a first remaining required bandwidth value of the traffic bearing entity and the assured bandwidth configuration upper limit value of the traffic bearing entity. The first remaining required bandwidth value of the traffic bearing entity is a difference between the required bandwidth value of the traffic bearing entity and the fixed bandwidth value of the traffic bearing entity. This implementation proposes a simpler implementation than the foregoing implementation. The bandwidth allocation device directly multiplies the first remaining bandwidth value of the PON port by the third bandwidth allocation ratio of the traffic bearing entity, to obtain the assured bandwidth value of the traffic bearing entity. In this process, the bandwidth allocation device determines the assured bandwidth value of each traffic bearing entity by performing bandwidth allocation only one time. The third allocation ratio may reflect the bandwidth actually required by each traffic bearing entity and the bandwidth configuration upper limit of the traffic bearing entity. Therefore, in this implementation, bandwidth allocation can be relatively appropriate, and the bandwidth allocation process can be simple and efficient.

In some other implementations, the determining module 702 is further configured to: when a difference between the first remaining bandwidth value of the PON port of the central office equipment and a cumulative sum of the assured bandwidth values of the traffic bearing entities is greater than zero, allocate a non-assured bandwidth value or a best-effort bandwidth value to each traffic bearing entity. In this implementation, after the bandwidth allocation device allocates the fixed bandwidth value and the assured bandwidth value to each traffic bearing entity, if the PON port of the bandwidth allocation device still has bandwidth, the bandwidth allocation device may further allocate the non-assured bandwidth value and the best-effort bandwidth value to the traffic bearing entity. Therefore, the bandwidth allocation device may fully use remaining bandwidth of the PON port, so that more bandwidth can be allocated to each traffic bearing entity.

In some other implementations, the bandwidth allocation device 70 further includes: a pre-configuration module 704, configured to set the bandwidth configuration upper limit for each traffic bearing entity in each customer premises equipment. In an example embodiment, the bandwidth configuration upper limit of each traffic bearing entity is set by the bandwidth allocation device for the traffic bearing entity before a bandwidth allocation period. Therefore, the bandwidth allocation device may learn of the fixed bandwidth configuration upper limit value and the assured bandwidth configuration upper limit value of each traffic bearing entity.

In some other implementations, the obtaining module 701 includes a receiving submodule 7011, configured to receive a bandwidth allocation request sent by each customer premises equipment, where the bandwidth allocation request includes the required bandwidth value of each traffic bearing entity in the customer premises equipment. In an example embodiment, the bandwidth allocation device obtains the required bandwidth value of each traffic bearing entity by receiving the bandwidth allocation request. In this implementation, the bandwidth allocation device may directly obtain the required bandwidth value of each traffic bearing entity. In this way, the bandwidth allocation device refers to the required bandwidth value of each traffic bearing entity to determine the bandwidth value actually allocated to the traffic bearing entity.

In some other implementations, the obtaining module 701 includes a traffic monitoring submodule 7012, configured to: monitor actual traffic information that is of each traffic bearing entity in each customer premises equipment and that is in a preset time range, and determine the required bandwidth value of the traffic bearing entity based on the actual traffic information. This implementation proposes another manner of determining the required bandwidth value of each traffic bearing entity. The bandwidth allocation device may determine the required bandwidth value of each traffic bearing entity through traffic monitoring. Therefore, flexibility of the implementation in which the bandwidth allocation device determines the required bandwidth value of each traffic bearing entity can be improved.

It should be further understood that, in the foregoing method embodiments corresponding to FIG. 2 to FIG. 6, steps performed by the central office equipment or the OLT may be based on the structure of the bandwidth allocation device 70 shown in FIG. 7.

Figure 8:
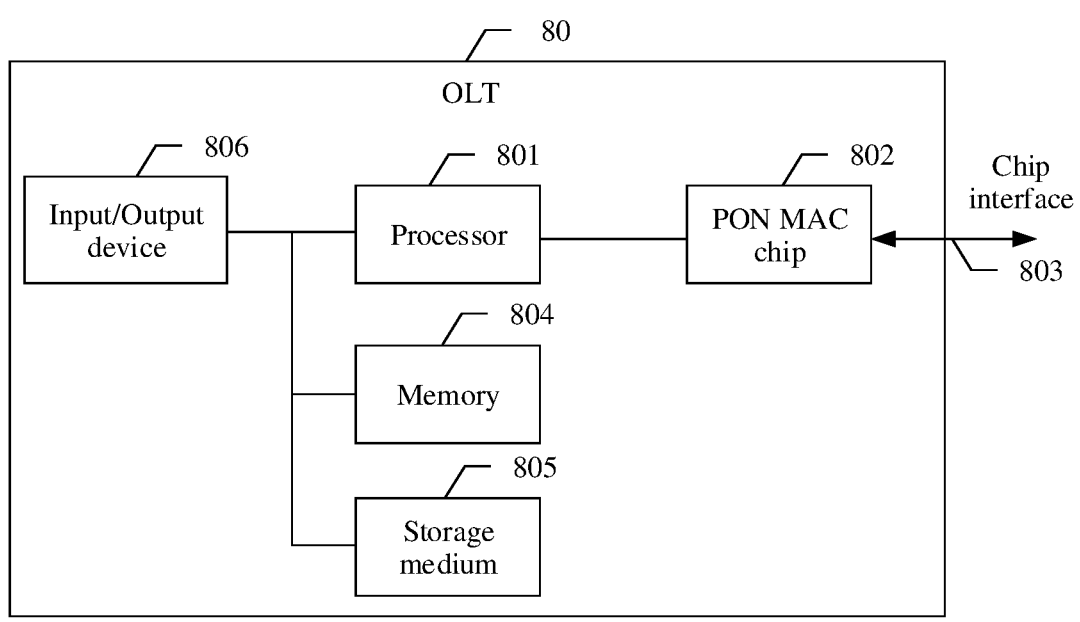
FIG. 8 is a schematic diagram of another embodiment of a bandwidth allocation device according to an embodiment of this application.

The foregoing describes an implementation of the bandwidth allocation device. The following describes another implementation of the bandwidth allocation device in this embodiment by using an example in which the bandwidth allocation device is an OLT. FIG. 8 is a schematic structural diagram of an OLT 80. The OLT 80 may vary greatly with configuration or performance. The OLT 80 may include one or more processors (CPU) 801, a passive optical network (PON) MAC chip 802, and one or more chip interfaces 803. In addition, in some implementations, the OLT further includes a memory 804 and one or more storage media 805 (for example, one or more mass storage devices) that store an application program or data. The memory 804 and the storage medium 805 may be used for temporary storage or permanent storage.

The chip interface 803 is connected to the PON MAC chip 802. The PON MAC chip 802 may obtain a required bandwidth value of each traffic bearing entity in each customer premises equipment through the chip interface 803. In an embodiment, the PON MAC chip 802 may receive a bandwidth allocation request sent by each customer premises equipment through the chip interface 803, where the bandwidth allocation request includes the required bandwidth value of each traffic bearing entity in the customer premises equipment. Alternatively, the PON MAC chip 802 may monitor, through the chip interface 803, actual traffic information that is of each traffic bearing entity in each customer premises equipment and that is in a preset time range, and determine the required bandwidth value of the traffic bearing entity based on the actual traffic information.

The PON MAC chip 802 may also send an authorization message to each customer premises equipment through the chip interface 803.

The PON MAC chip 802 is further configured to determine, based on a bandwidth configuration upper limit of each traffic bearing entity and the required bandwidth value of the traffic bearing entity, a bandwidth value actually allocated to the traffic bearing entity. The PON MAC chip 802 includes a DBA function module. The PON MAC chip 802 is specifically configured to determine a fixed bandwidth value and an assured bandwidth value by using the DBA function module and the bandwidth allocation method in the foregoing embodiments. In some implementations, the PON MAC chip 802 is further configured to determine a non-assured bandwidth value and a best-effort bandwidth value by using the DBA function module.

The OLT 80 further includes an input/output device 806, and the input/output device 806 is configured to receive a bandwidth configuration upper limit that is set by a user. Therefore, the processor 801 sets the bandwidth configuration upper limit for each traffic bearing entity in each customer premises equipment based on the bandwidth configuration upper limit that is set by the user.

In some implementations, the DBA function module is located in the processor 801. In this case, the processor 801 is further configured to determine, based on the bandwidth configuration upper limit of each traffic bearing entity and the required bandwidth value of the traffic bearing entity, the bandwidth value actually allocated to the traffic bearing entity. The processor 801 may be further configured to determine the fixed bandwidth value and the assured bandwidth value by using the DBA function module and the bandwidth allocation method in the foregoing embodiments. In some implementations, the processor 801 is further configured to determine the non-assured bandwidth value and the best-effort bandwidth value by using the DBA function module.

It should be further understood that, in the foregoing method embodiments corresponding to FIG. 2 to FIG. 6, steps performed by the central office equipment or the OLT may be based on the structure of the OLT 80 shown in FIG. 8.

In this embodiment, the OLT may determine, based on a fixed bandwidth configuration upper limit value of each traffic bearing entity, an assured bandwidth configuration upper limit value of the traffic bearing entity, and the required bandwidth value of the traffic bearing entity, the bandwidth value actually allocated to the traffic bearing entity. The OLT considers more factors during bandwidth allocation, and may allocate a part of bandwidth to each traffic bearing entity. This avoids a case in which no bandwidth is allocated to some traffic bearing entities. Therefore, resource allocation is more appropriate.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A bandwidth allocation method, comprising:
obtaining, by a piece of central office equipment, a required bandwidth value of each of a plurality of traffic bearing entities in each piece of customer premises equipment from one or more pieces of customer premises equipment;

upon determination that a total sum of a cumulative sum of fixed bandwidth configuration upper limit values of the plurality of traffic bearing entities and a cumulative sum of assured bandwidth configuration upper limit values of the plurality of traffic bearing entities is greater than a maximum bandwidth value of a passive optical network (PON) port of the piece of central office equipment, determining, by the piece of central office equipment based on a bandwidth configuration upper limit of each of the plurality of traffic bearing entities and the required bandwidth value of the traffic bearing entity, a bandwidth value actually allocated to the traffic bearing entity, wherein the bandwidth configuration upper limit comprises the fixed bandwidth configuration upper limit value of the traffic bearing entity and the assured bandwidth configuration upper limit value of the traffic bearing entity; and sending, by the piece of central office equipment, an authorization message to each piece of the one or more pieces of customer premises equipment, wherein the authorization message indicates the bandwidth value actually allocated to each traffic bearing entity in the piece of customer premises equipment, wherein the bandwidth value actually allocated to the traffic bearing entity comprises a fixed bandwidth value of the traffic bearing entity and an assured bandwidth value of the traffic bearing entity; and the determining, by the piece of central office equipment based on a bandwidth configuration upper limit of each of the plurality of traffic bearing entities and the required bandwidth value of the traffic bearing entity, a bandwidth value actually allocated to the traffic bearing entity comprises:

determining, by the piece of central office equipment, a fixed bandwidth value of each of the plurality of traffic bearing entities based on the fixed bandwidth configuration upper limit value of the traffic bearing entity; and determining, by the piece of central office equipment, the assured bandwidth value of each of the plurality of traffic bearing entities based on a first remaining bandwidth value of the PON port of the piece of central office equipment and a bandwidth allocation ratio, wherein the first remaining bandwidth value of the PON port of the piece of central office equipment is a difference between the maximum bandwidth value of the PON port of the piece of central office equipment and a cumulative sum of the fixed bandwidth values of the plurality of traffic bearing entities, wherein the bandwidth allocation ratio comprises a second bandwidth allocation ratio;

the bandwidth value actually allocated to the traffic bearing entity comprises the fixed bandwidth value of the traffic bearing entity and the assured bandwidth value of the traffic bearing entity; and the determining, by the piece of central office equipment, the assured bandwidth value of each of the plurality of traffic bearing entities based on a first remaining bandwidth value of the PON port of the piece of central office equipment and a bandwidth allocation ratio comprises:

multiplying, by the piece of central office equipment, the first remaining bandwidth value of the PON port of the piece of central office equipment by the second bandwidth allocation ratio, to obtain the assured bandwidth value of the traffic bearing entity,
wherein the second bandwidth allocation ratio is equal to a ratio of a ratio factor of the traffic bearing entity to a cumulative sum of ratio factors of the plurality of traffic bearing entities, the ratio factor of the traffic bearing entity is a smaller value in a first remaining required bandwidth value of the traffic bearing entity and the assured bandwidth configuration upper limit value of the traffic bearing entity, and the first remaining required bandwidth value of the traffic bearing entity is a difference between the required bandwidth value of the traffic bearing entity and the fixed bandwidth value of the traffic bearing entity.

2. A bandwidth allocation method, comprising:
obtaining, by a piece of central office equipment, a required bandwidth value of each of a plurality of traffic bearing entities in each piece of customer premises equipment from one or more pieces of customer premises equipment;
upon determination that a total sum of a cumulative sum of fixed bandwidth configuration upper limit values of the plurality of traffic bearing entities and a cumulative sum of assured bandwidth configuration upper limit values of the plurality of traffic bearing entities is greater than a maximum bandwidth value of a passive optical network (PON) port of the piece of central office equipment, determining, by the piece of central office equipment based on a bandwidth configuration upper limit of each of the plurality of traffic bearing entities and the required bandwidth value of the traffic bearing entity, a bandwidth value actually allocated to the traffic bearing entity, wherein the bandwidth configuration upper limit comprises the fixed bandwidth configuration upper limit value of the traffic bearing entity and the assured bandwidth configuration upper limit value of the traffic bearing entity; and
sending, by the piece of central office equipment, and authorization message to each piece of the one or more pieces of customer premises equipment, wherein the authorization message indicates the bandwidth value actually allocated to each traffic bearing entity in the piece of customer premises equipment,
wherein the bandwidth value actually allocated to the traffic bearing entity comprises a fixed bandwidth value of the traffic bearing entity and an assured bandwidth value of the traffic bearing entity; and
the determining, by the piece of central office equipment based on a bandwidth configuration upper limit of each of the plurality of traffic bearing entities and the required bandwidth value of the traffic bearing entity, a bandwidth value actually allocated to the traffic bearing entity comprises:
determining, by the piece of central office equipment, a fixed bandwidth value of each of the plurality of traffic bearing entities based on the fixed bandwidth configuration upper limit value of the traffic bearing entity; and
determining, by the piece of central office equipment, the assured bandwidth value of each of the plurality of traffic bearing entities based on a first remaining bandwidth value of the PON port of the piece of central office equipment and a bandwidth allocation ratio, wherein the first remaining bandwidth value of the PON port of the piece of central office equipment is a difference between the maximum bandwidth value of the PON port of the piece of central office equipment and a cumulative sum of the fixed bandwidth values of the plurality of traffic bearing entities,
wherein the bandwidth allocation ratio comprises a first bandwidth allocation ratio; and
the determining, by the piece of central office equipment, the assured bandwidth value of each of the plurality of traffic bearing entities based on a first remaining bandwidth value of the PON port of the piece of central office equipment and a bandwidth allocation ratio comprises:
multiplying, by the piece of central office equipment, the first remaining bandwidth value of the PON port of the piece of central office equipment by the first bandwidth allocation ratio, to obtain a first weighted bandwidth value of the traffic bearing entity;
determining, by the piece of central office equipment as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity, wherein the first remaining required bandwidth value of the traffic bearing entity is a difference between the required bandwidth value of the traffic bearing entity and the fixed bandwidth value of the traffic bearing entity;
calculating, by the piece of central office equipment, a second remaining bandwidth value of the PON port, wherein the second remaining bandwidth value of the PON port is equal to a difference between the first remaining bandwidth value of the PON port and a cumulative sum of first assured bandwidth values of the plurality of traffic bearing entities; and
when the second remaining bandwidth value of the PON port is equal to zero, determining, by the piece of central office equipment, that the assured bandwidth value of the traffic bearing entity is equal to the first assured bandwidth value of the traffic bearing entity.

3. The bandwidth allocation method according to claim 2, wherein the first bandwidth allocation ratio is equal to a ratio of the assured bandwidth configuration upper limit value of the traffic bearing entity to the cumulative sum of the assured bandwidth configuration upper limit values of the plurality of traffic bearing entities.

4. The bandwidth allocation method according to claim 2, wherein the bandwidth allocation ratio further comprises a second bandwidth allocation ratio; and
the method further comprises:
when the second remaining bandwidth value of the PON port is greater than zero and a target traffic bearing entity exists, multiplying, by the piece of central office equipment, the second remaining bandwidth value of the PON port by the second bandwidth allocation ratio, to obtain a second weighted bandwidth value of the target traffic bearing entity, wherein the target traffic bearing entity is a traffic bearing entity whose second remaining required bandwidth value is greater than zero, and the second remaining required bandwidth value is a difference between the first remaining required bandwidth value of the traffic bearing entity and the first assured bandwidth value of the traffic bearing entity;
determining, by the piece of central office equipment as a second assured bandwidth value of the target traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity;

calculating, by the piece of central office equipment, a third remaining bandwidth value of the PON port, wherein the third remaining bandwidth value of the PON port is equal to a difference between the second remaining bandwidth value of the PON port and a cumulative sum of second assured bandwidth values of a plurality of target traffic bearing entities; and when the third remaining bandwidth value of the PON port is equal to zero, determining, by the piece of central office equipment, that the assured bandwidth value of the target traffic bearing entity is equal to a sum of the first assured bandwidth value of the target traffic bearing entity and the second assured bandwidth value of the target traffic bearing entity.

5. The bandwidth allocation method according to claim 4, wherein the second bandwidth allocation ratio is equal to a ratio of the assured bandwidth configuration upper limit value of the target traffic bearing entity to a cumulative sum of the assured bandwidth configuration upper limit values of the plurality of target traffic bearing entities.

6. A bandwidth allocation device, wherein the bandwidth allocation device comprises at least one processor configured to:

obtain a required bandwidth value of each of a plurality of traffic bearing entities in each piece of customer premises equipment from one or more pieces of customer premises equipment;

upon determination that a total sum of a cumulative sum of fixed bandwidth configuration upper limit values of the plurality of traffic bearing entities and a cumulative sum of assured bandwidth configuration upper limit values of the plurality of traffic bearing entities is greater than a maximum bandwidth value of a passive optical network (PON) port of the bandwidth allocation device, determine, based on a bandwidth configuration upper limit of each of the plurality of traffic bearing entities and the required bandwidth value of the traffic bearing entity, a bandwidth value actually allocated to the traffic bearing entity, wherein the bandwidth configuration upper limit comprises the fixed bandwidth configuration upper limit value of the traffic bearing entity and the assured bandwidth configuration upper limit value of the traffic bearing entity; and send an authorization message to each piece of the one or more pieces of customer premises equipment, wherein the authorization message indicates the bandwidth value actually allocated to each of the plurality of traffic bearing entities in the piece of customer premises equipment, wherein the bandwidth value actually allocated to the traffic bearing entity comprises a fixed bandwidth value of the traffic bearing entity and an assured bandwidth value of the traffic bearing entity; and the at least one processor is further configured to:

determine a fixed bandwidth value of each of the plurality of traffic bearing entities based on the fixed bandwidth configuration upper limit value of the traffic bearing entity; and determine the assured bandwidth value of each of the plurality of traffic bearing entities based on a first remaining bandwidth value of the PON port of the bandwidth allocation device and a bandwidth allocation ratio, wherein the first remaining bandwidth value of the PON port of the bandwidth allocation device is a difference between the maximum bandwidth value of the PON port of the bandwidth allocation device and a cumulative sum of the fixed bandwidth values of the plurality of traffic bearing entities, wherein the bandwidth allocation ratio comprises a second bandwidth allocation ratio;

the bandwidth value actually allocated to the traffic bearing entity comprises the fixed bandwidth value of the traffic bearing entity and the assured bandwidth value of the traffic bearing entity; and the at least one processor is further configured to multiply the first remaining bandwidth value of the PON port of the bandwidth allocation device by the second bandwidth allocation ratio, to obtain the assured bandwidth value of the traffic bearing entity, wherein the second bandwidth allocation ratio is equal to a ratio of a ratio factor of the traffic bearing entity to a cumulative sum of ratio factors of the plurality of traffic bearing entities, the ratio factor of the traffic bearing entity is a smaller value in a first remaining required bandwidth value of the traffic bearing entity and the assured bandwidth configuration upper limit value of the traffic bearing entity, and the first remaining required bandwidth value of the traffic bearing entity is a difference between the required bandwidth value of the traffic bearing entity and the fixed bandwidth value of the traffic bearing entity.

7. The bandwidth allocation device according to claim 6, wherein the bandwidth allocation device is a piece of central office equipment or a chip or a group of chips in the piece of central office equipment.

8. The bandwidth allocation device according to claim 7, wherein, when the bandwidth allocation device is a chip or a group of chips in the piece of central office equipment, the bandwidth allocation device further comprises a chip interface, configured to collect actual traffic of a piece of customer premises equipment or a status report of the piece of customer premises equipment.

9. The bandwidth allocation device according to claim 6, wherein the bandwidth allocation device further comprises a memory configured to store program instructions or data.

10. A bandwidth allocation device, wherein the bandwidth allocation device comprises at least one processor, and the at least one processor is configured to:

obtain a required bandwidth value of each of a plurality of traffic bearing entities in each piece of customer premises equipment from one or more pieces of customer premises equipment;

upon determination that a total sum of a cumulative sum of fixed bandwidth configuration upper limit values of the plurality of traffic bearing entities and a cumulative sum of assured bandwidth configuration upper limit values of the plurality of traffic bearing entities is greater than a maximum bandwidth value of a passive optical network (PON) port of the bandwidth allocation device, determine, based on a bandwidth configuration upper limit of each of the plurality of traffic bearing entities and the required bandwidth value of the traffic bearing entity, a bandwidth value actually allocated to the traffic bearing entity, wherein the bandwidth configuration upper limit comprises the fixed bandwidth configuration upper limit value of the traffic bearing entity and the assure bandwidth configuration upper limit value of the traffic bearing entity; and send an authorization message to each piece of the one or more pieces of customer premises equipment, wherein the authorization message indicates the bandwidth value actually allocated to each of the plurality of traffic bearing entities in the piece of customer premises equipment, wherein the bandwidth value actually allocated to the traffic bearing entity comprises a fixed bandwidth value of the traffic bearing entity and an assured bandwidth value of the traffic bearing entity; and the at least one processor is further configured to:

determine a fixed bandwidth value of each of the plurality of traffic bearing entities based on the fixed bandwidth configuration upper limit value of the traffic bearing entity; and determine the assured bandwidth value of each of the plurality of traffic bearing entities based on a first remaining bandwidth value of the PON port of the bandwidth allocation device and a bandwidth allocation ratio, wherein the first remaining bandwidth value of the PON port of the bandwidth allocation device is a difference between the maximum bandwidth value of the PON port of the bandwidth allocation device and a cumulative sum of the fixed bandwidth values of the plurality of the traffic bearing entities, wherein the bandwidth allocation ratio comprises a first bandwidth allocation ratio; and the at least one processor is further configured to:

multiply the first remaining bandwidth value of the PON port of the bandwidth allocation device by the first bandwidth allocation ratio, to obtain a first weighted bandwidth value of the traffic bearing entity;

determine, as a first assured bandwidth value of the traffic bearing entity, a minimum value among the first weighted bandwidth value of the traffic bearing entity, the assured bandwidth configuration upper limit value of the traffic bearing entity, and a first remaining required bandwidth value of the traffic bearing entity, wherein the first remaining required bandwidth value of the traffic bearing entity is a difference between the required bandwidth value of the traffic bearing entity and the fixed bandwidth value of the traffic bearing entity;

calculate a second remaining bandwidth value of the PON port, wherein the second remaining bandwidth value of the PON port is equal to a difference between the first remaining bandwidth value of the PON port and a cumulative sum of first assured bandwidth values of the plurality of traffic bearing entities; and when the second remaining bandwidth value of the PON port is equal to zero, determine that the assured bandwidth value of the traffic bearing entity is equal to the first assured bandwidth value of the traffic bearing entity.

11. The bandwidth allocation device according to claim 10, wherein the first bandwidth allocation ratio is equal to a ratio of the assured bandwidth configuration upper limit value of the traffic bearing entity to the cumulative sum of the assured bandwidth configuration upper limit values of the plurality of traffic bearing entities.

12. The bandwidth allocation device according to claim 10, wherein the bandwidth allocation ratio further comprises a second bandwidth allocation ratio; and the at least one processor is further configured to:

when the second remaining bandwidth value of the PON port is greater than zero and there are a plurality of target traffic bearing entities, multiply the second remaining bandwidth value of the PON port by the second bandwidth allocation ratio, to obtain a second weighted bandwidth value of the target traffic bearing entity, wherein the target traffic bearing entity is a traffic bearing entity whose second remaining required bandwidth value is greater than zero, and the second remaining required bandwidth value is a difference between the first remaining required bandwidth value of the traffic bearing entity and the first assured bandwidth value of the traffic bearing entity;

determine, as a second assured bandwidth value of the target traffic bearing entity, a minimum value among the second weighted bandwidth value of the target traffic bearing entity, the assured bandwidth configuration upper limit value of the target traffic bearing entity, and the second remaining required bandwidth value of the target traffic bearing entity;

calculate a third remaining bandwidth value of the PON port, wherein the third remaining bandwidth value of the PON port is equal to a difference between the second remaining bandwidth value of the PON port and a cumulative sum of second assured bandwidth values of the plurality of target traffic bearing entities; and when the third remaining bandwidth value of the PON port is equal to zero, determine that the assured bandwidth value of the target traffic bearing entity is equal to a sum of the first assured bandwidth value of the target traffic bearing entity and the second assured bandwidth value of the target traffic bearing entity.

13. The bandwidth allocation device according to claim 12, wherein the second bandwidth allocation ratio is equal to a ratio of the assured bandwidth configuration upper limit value of the target traffic bearing entity to a cumulative sum of the assured bandwidth configuration upper limit values of the plurality of target traffic bearing entities.

* * * * *

UNITED STATES PATENT AND TRADEMARK OFFICE
CERTIFICATE OF CORRECTION

PATENT NO. : 11,800,265 B2
APPLICATION NO. : 17/535073
DATED : October 24, 2023
INVENTOR(S) : Lun Zhang It is certified that error appears in the above-identified patent and that said Letters Patent is hereby corrected as shown below:

In the Claims

• Column 43, Claim 2, Line 39, change "office equipment, and" to "office equipment, an"; and

• Column 46, Claim 10, Line 64, change "assure bandwidth" to "assured bandwidth".

Signed and Sealed this
Twenty-first Day of November, 2023

Katherine Kelly Vidal
*Director of the United States Patent and Trademark Office*